US006278464B1

(12) United States Patent
Kohavi et al.

(10) Patent No.: US 6,278,464 B1
(45) Date of Patent: *Aug. 21, 2001

(54) METHOD, SYSTEM, AND COMPUTER PROGRAM PRODUCT FOR VISUALIZING A DECISION-TREE CLASSIFIER

(75) Inventors: Ron Kohavi, Mountain View; Joel D. Tesler, Cupertino, both of CA (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/813,336

(22) Filed: Mar. 7, 1997

(51) Int. Cl.[7] .................................................. G06F 15/00
(52) U.S. Cl. ............................................................ 345/440
(58) Field of Search .................................. 345/440, 441, 345/442, 357

(56) References Cited

U.S. PATENT DOCUMENTS

| | | |
|---|---|---|
| 3,816,726 | 6/1974 | Sutherland et al. . |
| 4,719,571 | 1/1988 | Rissanen et al. ..................... 364/300 |
| 4,868,771 | 9/1989 | Quick et al. . |
| 4,928,247 | 5/1990 | Doyle et al. . |
| 4,994,989 | 2/1991 | Usami et al. . |
| 5,043,920 | 8/1991 | Malm et al. . |
| 5,072,395 | 12/1991 | Bliss et al. . |
| 5,150,457 | 9/1992 | Behm et al. . |
| 5,164,904 | 11/1992 | Sumner . |
| 5,201,047 | 4/1993 | Maki et al. ........................... 395/600 |
| 5,228,119 | 7/1993 | Mihalisin et al. .................... 395/118 |
| 5,247,666 | 9/1993 | Buckwold ............................ 395/600 |
| 5,251,131 | 10/1993 | Masand et al. .................. 364/419.08 |
| 5,253,333 | 10/1993 | Abe ....................................... 395/62 |
| 5,282,262 | 1/1994 | Kurashige . |
| 5,295,243 | 3/1994 | Robertson et al. . |
| 5,303,388 | 4/1994 | Kreitman et al. ..................... 395/159 |
| 5,307,456 | 4/1994 | MacKay . |
| 5,325,445 | 6/1994 | Herbert ................................... 382/38 |
| 5,418,946 | 5/1995 | Mori ..................................... 395/600 |
| 5,420,968 | 5/1995 | Johri ..................................... 395/133 |
| 5,426,780 | 6/1995 | Gerull et al. ......................... 395/600 |
| 5,459,829 | 10/1995 | Doi et al. . |
| 5,463,773 | 10/1995 | Sakakibara et al. ................. 395/600 |
| 5,515,486 | 5/1996 | Amro et al. ......................... 395/137 |

(List continued on next page.)

OTHER PUBLICATIONS

Venables et al. "Modern Applied Statistics with S–PLUS" Springer, pp. 413–427, 1994.*
Amsbury, W., *Data Structures from Arrays to Priority Queues*, Wadsworth Publishing, Belmont, CA, pp. viii and 331–336, Copyright 1985.
Date et al., *A Guide to SQL/DS*, Addison–Wesley Publishing, New York, NY, pp. xiii and 97–118, Copyright 1989.

(List continued on next page.)

*Primary Examiner*—Phu K. Nguyen
(74) *Attorney, Agent, or Firm*—Sterne, Kessler, Goldstein & Fox, P.L.L.C.

(57) ABSTRACT

A method, system and a computer program product for visualizing a decision-tree classifier are provided. The structure of a decision-tree classifier is mapped into a three-dimensional decision-tree visualization. The three-dimensional decision-tree visualization is displayed, representing the structure of the decision-tree classifier. Nodes in the three-dimensional decision-tree visualization include graphical objects representing nodes arranged in a hierarchy. The nodes in the three-dimensional decision-tree visualization correspond to nodes in the decision-tree classifier. Graphical attributes representative of information at corresponding nodes of the decision-tree classifier are provided at each node in the three-dimensional decision-tree visualization.

34 Claims, 11 Drawing Sheets

U.S. PATENT DOCUMENTS

| | | | |
|---|---|---|---|
| 5,519,865 | 5/1996 | Kondo et al. | 395/600 |
| 5,528,735 * | 6/1996 | Strasnick et al. | 345/357 |
| 5,546,529 | 8/1996 | Bowers et al. | 395/159 |
| 5,553,163 | 9/1996 | Nivelle | 382/227 |
| 5,555,354 | 9/1996 | Strasnick et al. | 395/127 |
| 5,604,821 | 2/1997 | Ranganathan et al. | 382/236 |
| 5,634,087 | 5/1997 | Mammone et al. | 395/24 |
| 5,659,731 | 8/1997 | Gustafson | 395/604 |
| 5,671,333 | 9/1997 | Catlett et al. | 395/20 |
| 5,671,381 | 9/1997 | Strasnick et al. | 395/355 |
| 5,675,711 | 10/1997 | Kephart et al. | 395/22 |
| 5,675,785 | 10/1997 | Hall et al. | 395/613 |
| 5,675,786 | 10/1997 | McKee et al. | 395/614 |
| 5,678,015 | 10/1997 | Goh | 395/355 |
| 5,680,476 | 10/1997 | Schmidt et al. | 382/159 |
| 5,694,524 | 12/1997 | Evans | 395/77 |
| 5,696,964 | 12/1997 | Cox et al. | 395/605 |
| 5,706,495 | 1/1998 | Chadha et al. | 395/602 |
| 5,724,573 | 3/1998 | Agrawal et al. | 395/606 |
| 5,727,199 | 3/1998 | Chen et al. | 395/606 |
| 5,732,230 | 3/1998 | Cullen et al. | 395/339 |
| 5,737,487 | 4/1998 | Bellegarde et al. | 395/25.9 |
| 5,748,852 | 5/1998 | Mahler | 395/61 |
| 5,787,274 | 7/1998 | Agrawal et al. | 395/613 |
| 5,861,891 | 1/1999 | Becker | 345/433 |
| 5,877,775 * | 3/1999 | Theisen et al. | 345/440 |

OTHER PUBLICATIONS

Hecht–Nielsen, R., *Neurocomputing*, Addison–Wesley Publishing, New York, NY, pp. ix–xiii and 175–201, Copyright 1990.

Hsiao et al., "Supervised Textured Image Segmentation Using Feature Smoothing and Probabilistic Relaxation Techniques", *IEEE Transactions on Pattern Analysis and Machine Intelligence*, vol. 11, No. 12, pp. 1279–1292, Dec. 1989.

Robert et al., "Continuously Evolving Classification of Signals Corrupted by an Abrupt Change", *IEEE–IMS Workshop on Information Theory and Statistics*, p. 97, Oct. 1994.

Santos–Victor et al., "A Computer Vision System for the Characterization and Classification of Flames in Glass Furnaces", *IEEE Transactions on Industry Applications*, vol. 29, No. 3, pp. 470–478, Jun. 1993.

Taxt et al., "Segmentation of Document Images", *IEEE Transactions on Pattern Analysis and Machine Intelligence*, vol. 11, No. 12, pp. 1322–1329, Dec. 1989.

Carlbom et al., "A Hierarchical Data Structure for Representing the Spatial Decomposition of 3–D Objects", *IEEE Computer Graphics &Applications*, Apr. 1985, pp. 24–31.

Carlbom et al., "Planar Geometric Projections and Viewing Transformations" *Computing Surveys*, vol. 10, No. 4, Dec. 1978, pp. 465–502.

Beveaux, T., "Virtual Reality Gets Real", *New Media*, (Jan. 1993), pp. 32–35.

Graves, G.L., "NASA's Virtual Reality", *New Media*, (Jan. 1993), p. 36–38.

Graves, G.L., "Invasion of the Digital Puppets", *New Media*, (Jan. 1993), p. 38–40.

Yavelow, C., "3–D Sound Found in Space", *New Media*, (Jan. 1993), pp. 40–41.

Johnson, Brianand Ben Shneiderman, "Tree–Maps: A Space–Filling Approach to the Visualization of Hierarchical Information Structures", *IEEE Visualization Proceedings '91*, Oct. 1991, pp. 284–291.

Structural Dynamics Research Corporation News Release, "SDRC Annouces Software Translator Between CADAM and I–DEAS", Mar. 31, 1992.

Jacobson, Bob, "The Ultimate User Interface", *BYTE*, Apr. 1992, pp. 175, 176, 178, 180, and 182.

Clarkson, Mark A., "An Easier Interface", *BYTE*, Feb. 1991, pp. 277, 278, 280, 281, and 282.*

Radding, Alan, "PC GIS: Expert Gain But Also Some Pain", *Computerworld*, Feb. 17, 1992, p. 89.*

Hilderbrand, Carol, "GIS Vital in Utility's Duel with Competitor", *Computerworld*, Jan. 20, 1992, p. 43.*

Anthes, G.H., "GIS Eases Redistricting Worry", *Computerworld*, Oct. 7, 1991, p. 65.

Alexander, Michael, "GIS Sprouting Corporate Wings", *Computerworld*, Jul. 22, 1991, p. 20.

Wilder, C., "Virtual Reality Seeks Practicality", *Computerworld 26* (17), Apr. 27, 1992, p. 26.

Fairchild, Kim M., Steven E. Poltrock and George W. Furnas, "SemNet: Three–Dimensional Graphic Representations of Large Knowledge Bases", *Cognitive Science and its Applications for Human–Computer Interaction*, Guindon, Ed., 1988, pp. 201–233.

*Precision Visuals International Limited*, "Summary of PV–WAVE Point & Click Visual Data Analysis Software", 1991.

Flanagan, William G., "Cyberspace Meets Wall Street", *Forbes*, Jun. 22, 1992, pp. 164, 165, and 168.

Grinstein, G. et al., "Visualization for Knowledge Discovery", *Intl. J. Intelligent Systems* 7, 1992, pp. 637–648.

Fuller, J.E., Using Autocad, 3d Ed., Chapter 17, *Viewing 3–D Drawings*, 1989, pp. 17–1—17–14, and Tutorial, pp. 19–15—19–16, Delmar Publishers, Inc., Albany, NY 12212.

Alexander, M., "Visualizing Cleared–Off Desktops", *Computerworld 25* (18), May 6, 1991, p. 20.

Benedikt, M., ed., *Cyberspace First Steps*, The MIT Press, Cambridge, Massachusettes (1992), pp. 1–436.

Forrest, D., "Seeing Data in New Ways", *Computerworld*, Jun. 29, 1992, pp. 85–86.

Newquist, H.P., "Virtual Reality's Commerical Reality", *Computerworld 26* (3), pp. 93–95.

"Atlas Software: A New Dimension in Data Management", advertisement, Atlas Software, Strategic Mapping, Inc., San Jose, CA 95117 (page and date unknown).

"News: What's New—Business Software", *BYTE*, Mar. 1992, p. 78.

"A Map for All Reasons", advertisement, Strategic Mapping, Inc., San Jose, CA 95117 (page and date unknown).

News Release, Company: Information Builders, Dateline: Pacific Palisades, CA, "Remarkable 3D Main–Frame Grpahics Available for PC Users", Feb. 1985.

News Release, Company: Information Builders, Inc., Dateline: Palm Desert, CA, "Information Builders Announces Release 3.0 of PC/Focus DBMS", Jun. 1, 1987.

News Release, Company: Honeywell Bull, Dateline: Bilerica, MA "Relational Software System Increases Integration, Productivity for Honeywell Bull Users", Jul. 17, 1987.

News Release, Company: Alliant Computer Systems, Dateline: San Diego, CA, "TGS' Figaro To Be Marketed With Silicon Graphics", Jul. 8, 1988.

News Release, Company: Alliant Computer Systems, Dateline: Altanta, GA, "Alliant Debuts New Class of System The Visual Supercomputer", Aug. 2, 1988.

News Release, Company: Virtus, Dateline: Pleasanton, CA, "INDIVIDUAL Software Introduces Training for Micosoft Excel 3.0 Windows and Macintosh Versions", Jul. 31, 1991.

News Release, Company: Virtus Corporation, Dateline: Cary, NC, "Virtus Walkthrough Releases Quicktime Component", Nov. 1, 1991.

News Release, Company: Alias Research, Dateline: Toronto, Ontario, "Alias Ships Sketch!, Freeform 3D Illustration and Design Program", Nov. 15, 1991.

News Release, Company: Structural Dynamics Res. Intl. Business Machines, Dateline: Boston MA, "Alias Sketch (TM) Resumes Shipping: Freeform 3D Illustration and Design Tool", Feb. 19, 1992.

Pollack, A., "The 2–D Screen Gives 3–D World" New York Times (date unknown).

Foley et al., "Computer Graphics: Principals and Practice", Second Edition, Addison–Wesley Publishing Co., 1990, pp. 731–734 and color plate III.23.

Ahlberg et al., "IVEE: An Information Visualization & Exploration Environment," Proceedings of Information Visualization '95, 1995, pp. 66–73.

Becker et al., "Smooth Transactions between Bump Rendering Algorithms," *Computer Graphics Proceedings*, Annual Conference Series, 1993, pp. 183–190.

Becker et al., "Unsteady Flow Volumes,"*Proceedings of Visualization '95*, pp. 329–335, 1995.

Blinn, James F., "Light Reflection Functions for Simulation of Clouds and Dusty Surfaces," *Computer Graphics*, vol. 16, No. 3, Jul. 1982, pp. 116–124.

Crawfis et al., "Texture Splats for 3D Scalar and Vector Field Visualization," *Proceedings of IEEE Visualization '93*, 1993, pp. 261–265.

Crawfis et al., "Vector Field Visualization," *Computer Graphics and Applications*, vol. 14, 1994, pp. 50–56.

Inselberg et al., "Parallell Coordinates: A Tool for Visualizating Multidimensional Geometry," *Proceedings of Visualization '90*, pp. 361–378, 1990.

Laur et al., "Hierarchial Splatting: A Progressive Refinement Algorithm for Volume Rendering, " *Computer Graphics*, vol. 25, No. 4, Jul. 1991, pp. 285–288.

Levoy, Marc, "Volume Rendering: Display of Surfaces from Volume Data," *IEEE Computer Graphics and Applications*, vol. 8, No. 5, May 1988, pp. 29–37.

Martin et al., "High Dimensional Brushing for Interactive Exploration of Multivariate Data," *Proceedings of Visualization '95*, 1995, pp. 271–278.

Max et al., "Bump Shading for Volume Textures," *IEEE Computer Graphics and Applications*, Jul. 1994, pp. 18–20.

Max et al., "Flow Volumes for Interactive Vector Field Visualization," *Proceedings of Visualization '93*, 1993, pp. 19–24.

Sabella, Paolo, "A Rendering Algorithm for Visualizing 3D Scalar Fields," *Computer Graphics*, vol. 22, No. 4, Aug. 1988, pp. 51–58.

Stein et al., "Sorting and Hardware Assisted Rendering for Volume Visualization," *IEEE*, 1995, pp. 83–89.

Van Wijk et al., "HyperSlice," *Proceedings of Visualization '93*, 1993, pp. 119–125.

Westover, Lee, "Footprint Evaluation for Volume Rendering," *Computer Graphics*, vol. 24, No. 4, Aug. 1990, pp. 367–376.

Wilhelms et al., "A Coherent Projection Approach for Direct Volume Rendering," *Computer Graphics*, vol. 25, No. 4, Jul. 1991, pp. 275–284.

Wong et al., "Dual Multiresolution HyperSlice for Multivariate Data Visualization," *IEEE Symposium on Information Visualization*, Oct. 1996, pp. 74–75.

Aha, D.W. et al., "Instance–Based Learning Algorithms," *Machine Learning*, vol. 6, No. 1, pp. 37–66 (Jan. 1991).

Almuallim, H. and Dietterich, T.G., "Learning Boolean Concepts in the Presence of Many Irrelevant Features," *Artificial Intelligence*, vol. 69, Nos. 1–2, pp. 279–305 (Sep. 1994).

"Angoss Software Anounces Knowledge Studio Data Mining Solution," http://www.pathfinder.com/@@xIEkO-gYAVjbJZjkM/money/latest/press/PW/1997Oct27/92, Angoss Software Corporation, pp. 1–2, Oct. 1997.

"Angoss Software's KnowledgeSEEKER(TM) Compatible with SAS Institute," http://www.newswire.ca/releases/September1997/18/c3915.html, pp. 1–2, Canada Newswire, Sep. 1997.

Breiman et al., *Classification and Regression Trees*, Wadsworth International Group, entire Book (1984).

Cestnik, B., "Estimating Probabilities: A Crucial Task in Machine Learning," *Proceedings of the 9th European Conference on Artificial Intelligence*, pp. 147–149 (Aug. 1990).

"Companies in Data Mining and Knowledge Discovery," http://kdnuggets.com/companies.html, pp. 1–4, Last updated: Oct. 31, 1997.

Cormen, T.H., et al., *Introduction to Algorithms*, The MIT Press, pp. 263–280 (1990).

Cover and Thomas, *Elements of Information Theory*, Wiley Interscience, entire book, 1991.

Dasarathy, B.V., "Nearest neighbor (NN) Norms: (NN) Patterns Classification Techniques," (IBL), *IEEE Computer Society Press*, pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105–112 (1996).

Duda, R. and Hart, P., *Pattern Classification and Scene Analysis*, Wiley, entire book, (1973).

Fairchild, K.M., "Information Management Using Virtual Reality–Based Visualizations," *Virtual Reality Applications and Explorations*, ed. A. Wexelblat, Academic Press, Inc., pp. 45–74, Copyright (1993), Publication date Jul. 1, 1993.

Fisher, R.A., "The use of multiple measurements in taxonomic problems," *Annals of Eugenics*, vol. 7., No. 1, pp. 179–188 (1936).

Friedman, J. H. et al., "Lazy Decision Trees," *Proceedings of the Thirteenth National Conference on Artificial Intelligence*, AAAI Press and the MIT Press, vol. 1, pp. 717–724 (1996).

Good, I.J., *The Estimation of Probabilites: An Essay on Modern Bayesian Methods*, pp. xi–xii, MIT Press, pp. 1–79, (1965).

"IBM Digs Deep for Data Mining 'Gold'," http://www.software.ibm.com/data/intelli–mine/factsheet.html, pp. 1–8, IBM Corporation, Copyright 1997.

"KD Mine: Data Mining and Knowledge Discovery," http://kdnuggets.com/index_kdm.html, p. 1, Knowledge Discovery Nuggets, Copyright 1997, Last updated: Oct. 31, 1997.

Kittler, J., "Feature Selection and Extraction," *Handbook of Pattern Recognition and Image Processing*, Chapter 3, pp. 59–83, Academic Press, Inc., 1986.

Knuth, A., *The Art of Computer Programming*, Addison–Wesley, vol. 2, pp. 506–550 (1973).

Kohavi, R., "Scaling Up the Accuracy of Naive–Bayes Classifiers: a Decision–Tree Hybrid," In *Data Mining and Visulaization*, Silicon Graphics, Inc., from The Second International Conference on Knowledge Discovery and Data Mining (1996).

Kohavi, R., "A Study of Cross–Validation and Bootstrap for Accuracy Estimation and Model Selection," *Proceedings of the 14th International Joint Conference on Artificial Intelligence*, Stanford University, 1995.

Kohavi, R. and John, G., "Wrappers for Feature Subset Selection," http://robotics.stanford.edu/~{ronnyk,gjohn}, May 20, 1997.

Kohavi, R. and Li, C., "Oblivious Decision Trees, Graphs, and Top–Down Pruning," *Proceedings of the 14th International Joint Conference on Artificial Intelligence*, Chriss S. Mellish (Ed.), Morgan Kaufmann Publishers, Inc., pp. 1071–1077 (1995).

Kohavi, R. and Sommerfield, D., "Feature Subset Selection Using the Wrapper Model: Overfitting and Dynamic Search Space Topology," *Proceedings of the First International Conference on Knowledge Discovery and Data Mining*, pp. 192–197 (Aug. 1995).

Kohavi, R. et al., "Data Mining using MLC++: A Machine Learning Library Library in C++," *Tools With AI*, pp. 234–245 (1996).

Kononenko, I., "Inductive and Bayesian Learning in Medical Diagnosis," *Applied Artificial Intelligence*, vol. 7, pp. 317–337 (1993).

Langley, P. and Sage, S., "Induction of Selective Bayesian Classifiers," *Proceedings of the Tenth Conference on Uncertainty in Artificial Intelligence*, Morgan Kaufmann Publishers, Inc., pp. 399–406 (Jul. 1994).

Langley, P. and Sage, S., "Oblivious Decision Trees and Abstract Cases," *Working Notes of the AAAI–94 Workshop on Case–Based Reasoning*, AAAI Press, pp. 113–117 (1994).

Langley, P., et al., "An Analysis of Bayesian Classifiers," *Proceedings of the Tenth National Conference on Artificial Intelligence*, pp. 223–228 (Jul. 1992).

Lincoff, G., *National Audubon Society Field Guide to North American Mushrooms*, New York, pp. 9–32, (1981).

Mangasarian, O. L. and Wolberg, W. H., "Cancer Diagnosis Via Linear Programming," *SIAM News*, vol. 23, No. 5, pp. 1&18 (Sept. 1990).

Michie, et al., *Machine Learning Neural and Statistical Classification*, Ellis Norwood United, entire book, (1994).

Murthy, S. et al., "Randomized induction of oblique decision trees," *Proceedings of the Eleventh National Conference on Artificial Intelligence*, AAI Press/MIT Press, pp. 322–327 (1993).

"Other Web Sites for Data Mining and Knowledge Discovery," http:// kdnuggets.com/websites.html, pp. 1–3, Last updated: Sep. 10, 1997.

Quinlan, J.R., *C4.5: Programs for Machine Learning*, Morgan Kaufmann Publishers, Inc., pp. 17–26 (1993).

Quinlan, J.R., "Induction of Decision Trees," *Machine Learning*, vol. 1, No. 1,pp. 81–106 (1986).

Rendell, L. and Seshu, R., "Learning hard concepts through constructive induction: framework and rationale," *Computer Intelligence*, vol. 6, No. 4, pp. 247–270 (Nov. 1990).

"SAS Data Mining Solution," http://www.sas.com/software/data_mining/whitepapers/solution.html, pp. 1–6, SAS Institute Inc., Copyright 1997, Last Updated Sep. 26, 1997.

Schaffer, C., "A Conservation Law for Generalization Performance," *Machine Learning: Proceedings of the Eleventh International Conference*, Morgan Kaufmann Publishers, Inc., pp. 259–265 (1994).

Shavlik, J.W. and Dietterich, T.G. (Eds.), *Readings in Machine Learning*, Morgan Kaufmann Publishers, Inc., entire book, (1990).

"S*i*ftware: Tools for Data Mining and Knowledge Discovery," http://kdnuggets.com/siftware.html, pp. 1–2, Last updated: Oct. 31, 1997.

Thrun et al., "The Monk's Problems: A Performance Comparison of Different Learning Algorithms," *Technical Report CMU–CS–91–197*, Carnegie Mellon University pp. i–x and 1–112, (1991).

Utgoff, P., "Perceptron Trees: A Case Study in Hybrid Concept Representation," *Proceedings of the Seventh National Conference on Artificial Intelligence*, Morgan Kaufmann, vol. 2, pp. 601–606 (Aug. 1988).

Weiss, S.M. and Kulikowski, C.A., *Computer Systems That Learn: Classification and Prediction Methods from Statistics, Neural Nets, Machine Learning, and Expert Systems*, Morgan Kaufmann Publishers, Inc., entire book, (1991).

MineSet User's Guide, Silicon Graphics Computer Systems, 1996, made available to public less than one year prior to Mar. 7, 1997.

Greenwood, J., "Countdown to the Cybermarket," Financial Post Magazine, Mar. 1994, pp. 26–32.

Boyl, J. et al., "Design of a 3D user interface to a database," submitted to Database Issues for Data Visualization Workshop, Jul., 1993, pp. 1–9.

Gershon, N. et al., "Visualization's New Tack: Making Sense of Information," IEEE Spectrum, Nov., 1995, pp. 38–47 and 55.

"Mineset Awards," http://www.sgi.com/Products/software/MineSet/awards.html, pp. 1, (Jan. 9, 1998).

"Silicon Graphics MineSet Wins Bronze Miner Award," http://www.sgi.com/Headlines/1997/Oct/mineset_release-.html, pp. 1–2, (Oct. 1, 1997).

"The 1997 Database Dozen," by D. Stodder, http://www.db-pd.com/96dozen.htm, pp. 1–2, (1996 or 1997).

"A Dozen Companies on the Rise," http://www.dbpd.com/seconddz.htm, pp. 1–9, (Miller Freeman Inc. 1997).

"MineSet 2.0 for Data Mining and Multidimensional Data Analysis," by C. Hall, http://www.sgi.com/Products/software/MineSet/DMStrategies/, pp. 1–12, (1997). (originally appeared in Sep. 1997 issue of *Data Management Strategies*, Copyright 1997 Cutter Information Corp.).

* cited by examiner

FIG. 1
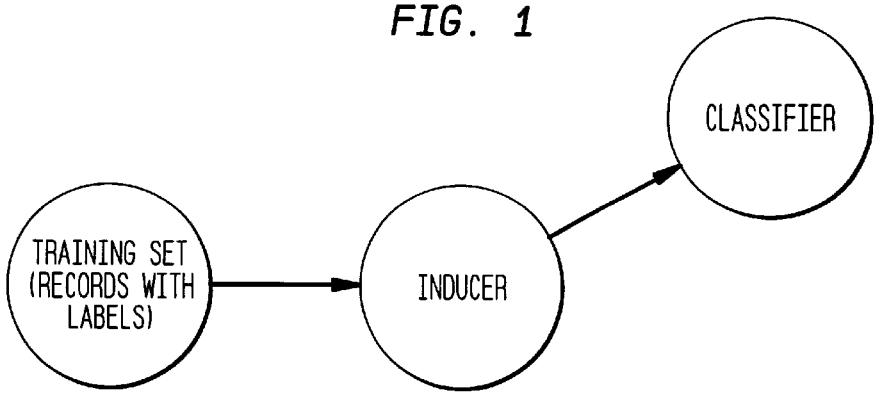
FIG. 2
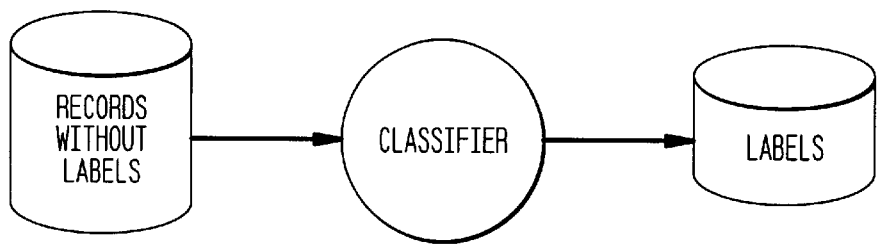
FIG. 3
|  | Descriptive Attributes | | | | Label |
|---|---|---|---|---|---|
|  | sepal_length | sepal_width | petal_length | petal_width | iris_type |
| Record 1 → | 5.1 | 3.5 | 1.4 | 0.2 | Iris_setosa |
| Record 2 → | 5.9 | 3.0 | 5.1 | 1.8 | Iris_virginica |
| Record 3 → | 6.5 | 2.8 | 4.6 | 1.5 | Iris_versicolor |
| ⋮ | 6.3 | 2.9 | 5.6 | 1.8 | Iris_virginica |
| ⋮ | 6.5 | 3.0 | 5.8 | 2.2 | Iris_virginica |

FIG. 4C

```
age <= 27 : <=50K (8031.0/269.7)
age > 27 :
|   education-num <=12 :
|   |   marital-status = Divorced: <=50K (3357.0/220.4)
|   |   marital-status = Never-married: <=50K (2904.0/124.0)
|   |   marital-status = Separated: <=50K (758.0/30.2)
|   |   marital-status = Widowed: <=50K (852.0/53.4)
|   |   marital-status = Married-spouse-absent: <=50K (266.0/15.1)
|   |   marital-status = Married-AF-spouse: <=50K (13.0/5.7)
|   |   marital-status = Married-civ-spouse:
|   |   |   education-num <= 8 : <=50K (1508.0/304.7)
|   |   |   education-num > 8 :
|   |   |   |   hours-per-week <= 34 : <=50K (745.0/160.3)
|   |   |   |   hours-per-week > 34 :
|   |   |   |   |   age <= 35 : <=50K (1927.0/562.3)
|   |   |   |   |   age > 35 :
|   |   |   |   |   |   occupation = Tech-support: >50K (175.2/63.1)
|   |   |   |   |   |   occupation = Other-service: <=50K (291.8/53.5)
|   |   |   |   |   |   occupation = Prof-specialty: >50K (254.5/108.6)
|   |   |   |   |   |   occupation = Handlers-cleaners: <=50K (142.2/43.9)
|   |   |   |   |   |   occupation = Farming-fishing: <=50K (258.6/64.2)
|   |   |   |   |   |   occupation = Transport-moving: <=50K (461.6/184.9)
|   |   |   |   |   |   occupation = Priv-house-serv: <=50K (5.2/1.3)
|   |   |   |   |   |   occupation = Armed-Forces: <=50K (0.0)
|   |   |   |   |   |   occupation = Craft-repair:
|   |   |   |   |   |   |   education-num <= 9 :
|   |   |   |   |   |   |   |   workclass = Self-emp-not-inc: <=50K (88.0/27.5)
|   |   |   |   |   |   |   |   workclass = Federal-gov: >50K (13.5/5.1)
|   |   |   |   |   |   |   |   workclass = Local-gov: <=50K (37.3/16.0)
|   |   |   |   |   |   |   |   workclass = State-gov: <=50K (14.5/4.9)
|   |   |   |   |   |   |   |   workclass = Without-pay: <=50K (0.0)
|   |   |   |   |   |   |   |   workclass = Never-worked: <=50K (0.0)
|   |   |   |   |   |   |   |   workclass = Private:
|   |   |   |   |   |   |   |   |   age <= 40 :
|   |   |   |   |   |   |   |   |   |   age > 37 : <=50K (82.7/22.5)
|   |   |   |   |   |   |   |   |   |   age <= 37 :
|   |   |   |   |   |   |   |   |   |   |   hours-per-week <= 44 : <=50K (45.7/12.8)
|   |   |   |   |   |   |   |   |   |   |   hours-per-week > 44 :
|   |   |   |   |   |   |   |   |   |   |   |   fnlwgt <= 168625 : <=50K (18.2/8.0)
|   |   |   |   |   |   |   |   |   |   |   |   fnlwgt <= 168625 : <=50K (15.0/5.8)
|   |   |   |   |   |   |   |   |   age <= 40 :
|   |   |   |   |   |   |   |   |   |   hours-per-week <= 41: <=50K (316.7/128.0)
|   |   |   |   |   |   |   |   |   |   hours-per-week > 41 : >50K (115.1/55.8)
|   |   |   |   |   |   |   |   workclass = Self-emp-inc:
|   |   |   |   |   |   |   |   |   fnlwgt <= 119033 : <=50K (7.2/1.3)
|   |   |   |   |   |   |   |   |   fnlwgt > 119033 : >50K (16.7/7.4)
|   |   |   |   |   |   |   education-num > 9 :
|   |   |   |   |   |   |   |   workclass = Self-emp-not-inc: <=50k (53.2/18.5)
|   |   |   |   |   |   |   |   workclass = Local-gov: >50K (24.5/12.5)
|   |   |   |   |   |   |   |   workclass = Without-pay: >50K (0.0)
|   |   |   |   |   |   |   |   workclass = Never-worked: >50K (0.0)
|   |   |   |   |   |   |   |   workclass = Private:
|   |   |   |   |   |   |   |   |   hours-per-week > 47 : >50K (93.4/35.7)
|   |   |   |   |   |   |   |   |   hours-per-week <= 47 :
```

METHOD, SYSTEM, AND COMPUTER PROGRAM PRODUCT FOR VISUALIZING A DECISION-TREE CLASSIFIER

CROSS-REFERENCE TO RELATED APPLICATION

This patent application is related to the following commonly owned United States utility application:

"Method, System, and Computer Program Product for Visualizing Data Using Partial Hierarchies," by Joel D. Tesler (appl. Ser. No. 08/813,347, filed concurrently herewith and incorporated herein by reference.

BACKGROUND OF THE INVENTION

1. Field of the Invention

The present invention relates generally to data visualization and data mining.

2. Related Art

Many data mining tasks require classification of data into classes. Typically, a classifier classifies the data into the classes. For example, loan applications can be classified into either "approve" or "disapprove" classes. The classifier provides a function that maps (classifies) a data item (instance) into one of several predefined classes. More specifically, the classifier predicts one attribute of a set of data given one or more attributes. For example, in a database of iris flowers, a classifier can be built to predict the type of iris (iris-setosa, iris-versicolor or iris-virginica) given the petal length, petal width, sepal length and sepal width. The attribute being predicted (in this case, the type of iris) is called the label, and the attributes used for prediction are called the descriptive attributes.

A classifier is generally constructed by an inducer. The inducer is an algorithm that builds the classifier from a training set. The training set consists of records with labels. The training set is used by the inducer to "learn" how to construct the classifier as shown in FIG. 1. Once the classifier is built, it can be used to classify unlabeled records as shown in FIG. 2.

Inducers require a training set which is a database table containing attributes, one of which is designated as the class label. The label attribute type must be discrete (e.g., binned values, character string values, or few integers). FIG. 3 shows several records from a sample training set.

Once a classifier is built, it can classify new records as belonging to one of the classes. These new records must be in a table that has the same attributes as the training set; however, the table need not contain the label attribute. For example, if a classifier for predicting iris_type is built, we can apply the classifier to records containing only the descriptive attributes, and a new column is added with the predicted iris type.

In a marketing campaign, for example, a training set can be generated by running the campaign at one city and generating label values according to the responses in the city. A classifier can then be induced and campaign mail sent only to people who are labeled by the classifier as likely to respond, but from a larger population, such as all the U.S. Such mailing can have substantial cost savings.

A well known type of classifier is the Decision-Tree classifier. The Decision-Tree classifier assigns each record to a class. The Decision-Tree classifier is induced (generated) automatically from data. The data, which is made up of records and a label associated with each record, is called the training set.

Decision-Trees are commonly built by recursive partitioning. A univarite (single attribute) split is chosen for the root of the tree using some criterion (e.g., mutual information, gain-ratio, gini index). The data is then divided according to the test, and the process repeats recursively for each child. After a full tree is built, a pruning step is executed which reduces the tree size.

A major problem associated with decision-tree classifiers is that they are difficult to visualize using available visualizers. This is especially true of large decision-trees with thousands of nodes. Current two-dimensional displays are very limited. One product by AT&T called Dotty provides a two-dimensional visualization, but interaction is limited to simple scrolling of canvas. FIG. 4A shows an example of a small decision-tree generated by Dotty. FIG. 4B shows an example of a large decision-tree generated by Dotty.

Another conventional technique generates a decision-tree as a simple two-dimensional ASCII display. FIG. 4C shows a simple ASCII display generated by a conventional visualizer. It is difficult to comprehend from the two-dimensional ASCII display how much data was used to build parts of the decision-tree. Also, it is difficult to analyze the data from the ASCII display. A large decision-tree is a complex structure that typically has thousands of nodes. Such a large decision-tree typically does not fit into a display screen. Although graphical displays used to visualize decision-tree classifiers can scroll, they do not provide a good solution for large trees with thousands of nodes. This is because, it is extremely difficult to follow a path in a tree having hundreds of nodes. Also, it is difficult to see the big picture when a tree has thousands of nodes. Other products that contain two-dimensional visualizations are SAS, SPLUS, Angoss' Knowledge Seeker, and IBM's Intelligent Data Miner.

SUMMARY OF THE INVENTION

As realized by the inventors, a three-dimensional visualization of a decision-tree classifier, also referred to as a decision-tree visualizer, is needed that is easy to visualize and comprehend. In addition, other advantages are provided by interactive navigation and search capabilities incorporated into the visualizer.

The present invention provides a method, system and a computer program product for visualizing a decision-tree classifier. The decision-tree visualizer provides more information about the decision-tree classifier than the mere decision-tree structure. Specifically, the visualizer shows how much data was used to build parts of the decision-tree. This indicates reliability and confidence of the subtrees in making predictions. Furthermore, the visualizer allows users to see interesting parts of the tree. For example, users can see nodes that represent skewed distribution of the data because of some special effects.

The present invention provides a decision-tree visualizer that displays quantitative and relational characteristics of data by showing them as hierarchically connected nodes in the decision-tree. Each node of a decision-tree contains graphical attributes whose height and color correspond to aggregation of data values. Lines connecting nodes show the relationship of one set of data to its subsets.

The decision-tree visualizer provides a fly-through environment for navigating through large trees. More importantly, users can view only a few levels or subtrees and dynamically expand the subtrees (comprised of one or more nodes). This feature of dynamically expanding subtrees is referred as the drill down capability.

Thus, while a tree can be very large with hundreds of thousands of nodes, the dynamic expansion feature lets users drill-down and view more information in the subtrees of interest. For example, a user can view a subtree comprised of one or more nodes and expand the subtree in order to get more information about the subtree. This removes the information overload that happens in many 2D non-interactive visualizers.

Briefly stated, the decision-tree visualizer comprises an inducer which constructs a decision-tree classifier from a training set. The inducer has a mapping module which creates visualization files from the training set. The visualization files are then transformed into graphical attributes which are displayed with the decision-tree classifier's structure.

The graphical attributes are clustered hierarchical blocks that are located at the root-node, child-nodes and leaf-nodes of the decision-tree classifier. The graphical attributes represent various characteristics of the dataset. For example, the graphical attributes shows relationship of one set of data to its subsets. Also, the graphical attributes provide information such as distributions, purity of classification and reliability of the classification.

In one embodiment of the present invention, the graphical attributes comprises a plurality of bars and bases. At each node of the decision-tree, there are one or more bars clustered together. The bars provide various information about the records at each node. For example, each bar represents a class of record. If at a particular node, there are three bars, then there are three classes of records at that node. A split may be performed at that node. The split may be a binary split or a multiway split. However, depending on the statistical significance of a split, a split may not be formed at nodes where there are multiple bars. A node with no children is a leaf-node. Leaf-nodes are labeled with a predicted class, usually the majority class at the leaf-node. If there is only a single bar at a particular node, then there is only a single class of record in that node. This implies that the decision-tree classifier has predicted the class at that node and no further split is necessary.

The height of each bar is proportional to the number of records in each class. The higher the number of records in each class, the higher is the bar. The heights of the bars at each node indicate the distribution of the classes at that node. Also, the heights of the bars at each node indicate the reliability, hence the confidence, of the classification.

Each node has a base. The bars at each node are clustered together on a base. The color of the base at each node indicates the purity of the classification at that node. In other words, the color of the base at each node indicates how easy it is to predict a class at that node.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein:

FIG. 1 is a schematic diagram of a conventional training set, inducer, and decision-tree classifier.

FIG. 2 is a schematic diagram showing the operation of the decision-tree classifier as shown in FIG. 1.

FIG. 3 shows example records in a training set.

FIG. 4C shows a conventional two-dimensional ASCII display of a decision-tree classifier.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Figure 4A:
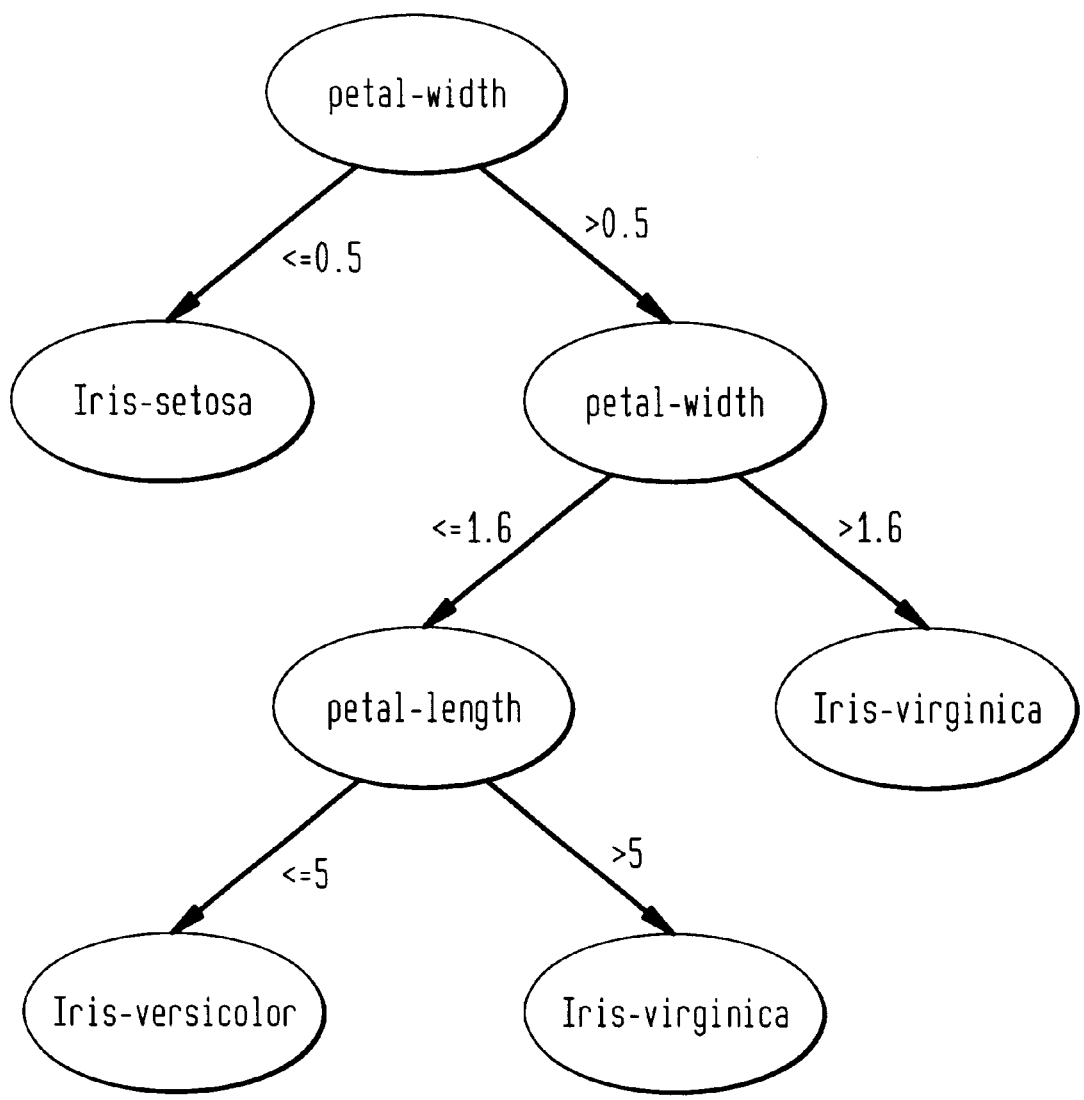
FIG. 4A shows a small decision-tree generated by Dotty (an AT&T product).

The present invention provides a decision-tree visualizer that creates a three-dimensional visualization of a decision-tree classifier. The decision-tree visualizer displays quantitative and relational characteristics of data by showing them as hierarchically connected nodes in the decision-tree. Lines connecting nodes show the relationship of one set of data to its subsets.

The three-dimensional decision-tree visualization has graphical objects and associated graphical attributes arranged in a hierarchical layout. Each node of a decision tee is represented by a graphical object. Each graphical object at each node has one or more graphical attributes. The graphical attributes provide different types of information about the records at each node.

For example, each class of record at a node can be represented by a first graphical attribute. Thus, the total number of the first graphical attributes at each node indicate the number of classes at that node. The first graphical attribute can be any type of graphical attribute, including but not limited to, a type of graphical object, such as, a bar or column. If there are three first graphical attributes (e.g., three bars) at a particular node, then there are three classes of records at that node. A split may be performed at that node. The split may be a binary or a multiway split. Depending on the statistical significance of a split, a split may not be performed at nodes where there are multiple bars. If there is only one first graphical attribute at a particular node, then there is only one class of records at that node. Thus, a prediction can be made at that node regarding the class and no further split is performed at that node.

A second graphical attribute can represent the number of records in each class. By viewing the second graphical attribute along with the first graphical attribute at a particular node, a user can learn about the distribution of various classes at that node. Also, the user can learn about the reliability, and hence the confidence, of a split at a particular node by viewing the second graphical attributes. In general, the second graphical attribute can be any graphical attribute. In one embodiment, the second graphical attribute is represented by a bar height where the bar represents a class.

A third graphical attribute can represent the purity of classification at each node. Thus, a viewer may learn how easy it is to make a prediction at each node by observing the graphical attribute at that node. The third graphical attribute can be any type of graphical attribute. In one embodiment, the purity is represented by a red, yellow and green color code at a node base. (The color code is similar to ordinary traffic lights wherein the colors red, green and yellow are used). Other graphical attributes can display other characteristics of the datasets.

The three-dimensional visualization of the decision-tree classifier is easy to visualize and comprehend. The decision-tree visualizer provides a fly-through environment for navigating through large trees. More importantly, users can view only a few levels or subtrees and dynamically expand the subtrees. Thus, while a tree can be very large with hundreds of thousands of nodes, the dynamic expansion feature lets users drill-down and view more information in the subtrees of interest. This removes the information overload that happens in many two-dimensional visualizers.

Figure 5:
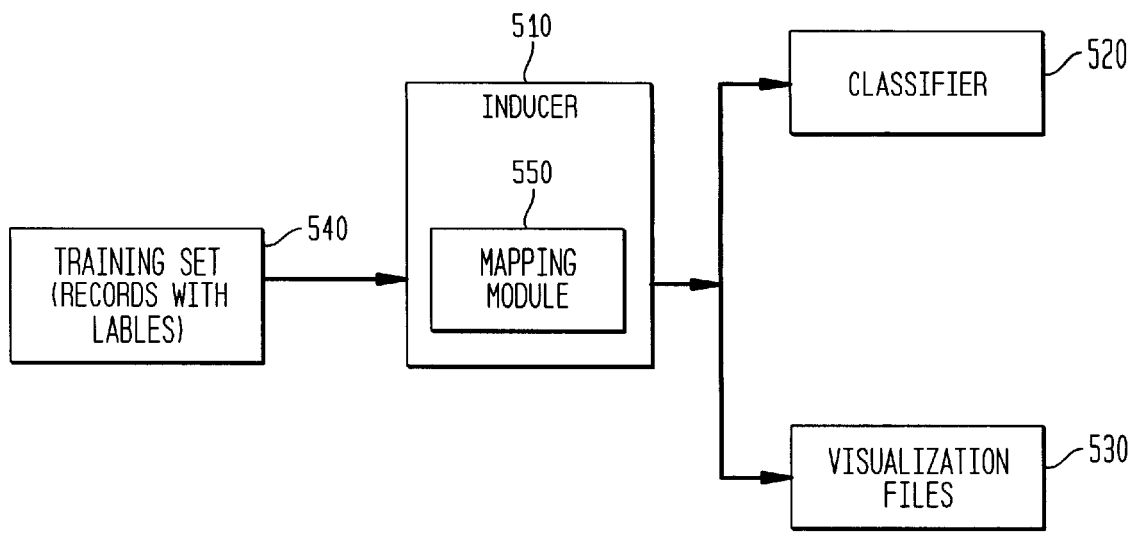
FIG. 5 is a schematic diagram showing a system for visualizing a decision-tree classifier, according to the present invention.

FIG. 5 shows an inducer 510 that constructs a classifier 520 and visualization file(s) 530 from a training set 540. A mapping module 550 resides in the inducer 510. The mapping module 550 maps the training set 540 to visualization files 530. Visualization files 530 are then transformed into a three-dimensional visualization of the decision-tree classifier. In this mapping, each node of decision-tree classifier 520 is represented by a corresponding graphical object and attributes in the three-dimensional visualization. The nodes are connected to each other by lines.

In one embodiment of the present invention, the graphical attributes are comprised of a plurality of bars and bases. At each node of the decision-tree, there are one or more bars clustered together. The bars provide various information about the records at each node. For example, each bar represents a class of record. If at a particular node, there are three bars, then there are three classes of records at that node. Thus, a split may be performed at that node. The split may be a binary split or a multi-way split. If there is only a single bar at a particular node, then there is only a single class of record in that node. This implies that the decision-tree classifier has predicted the class at that node and no further split is necessary.

The height of each bar is a function of the number of records in each class. For example, the bar height can be proportional to the number of records in each class. The higher the number of records in each class, the higher is the bar. The heights of the bars at each node indicate the distribution of the classes at that node. Also, the heights of the bars at each node indicate the reliability, hence the confidence, of the classification.

Each node has a base. The height of a base shows the total number of records of all classes at that corresponding node. The bars at each node are clustered together on a base. The color of the base at each node indicates the purity of the classification at that node. In other words, the color of the base at each node indicates how easy it is to predict a class at that node.

Figure 6:
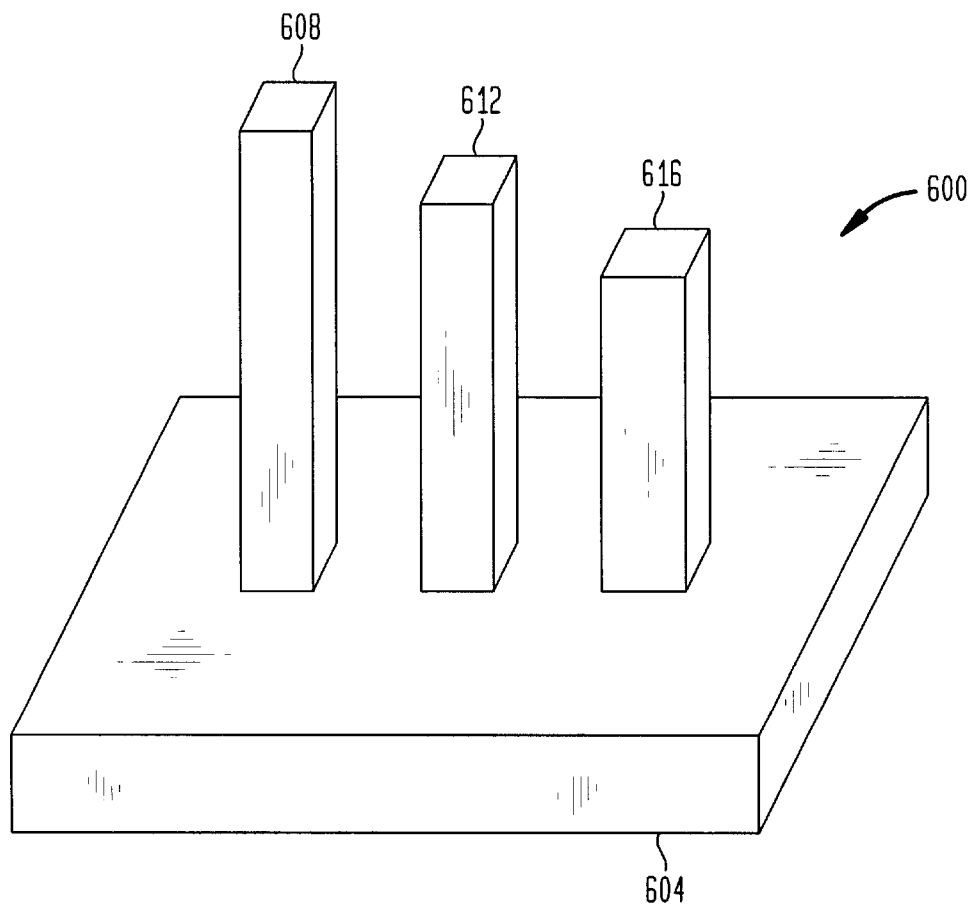
FIG. 6 shows an example node of the decision-tree visualizer in accordance with one embodiment of the present invention.

FIG. 6 shows an example node 600 of the decision-tree visualizer in accordance with one embodiment of the present invention. Specifically, FIG. 6 includes a base 604 and bars 608–616.

The bars 608–616 are placed on the base 604. As noted before, each bar represents a class. In this example, the bar 608 represents iris_setosa, the bar 612 represents $iris_{13}$ versicolor and the bar 616 represents iris_virginica. Thus, the decision-tree visualizer shows the number of classes of records at each node.

The height of each bar 608, 612, 616 is proportional to the number of records in each class. The higher the number of records in a class, the higher is the bar. Node 600 shows that there are more iris_setosa than there are iris_versicolor or iris_virginca. Thus, the bar 608 is higher than the bar 612 or the bar 616.

Figure 7:
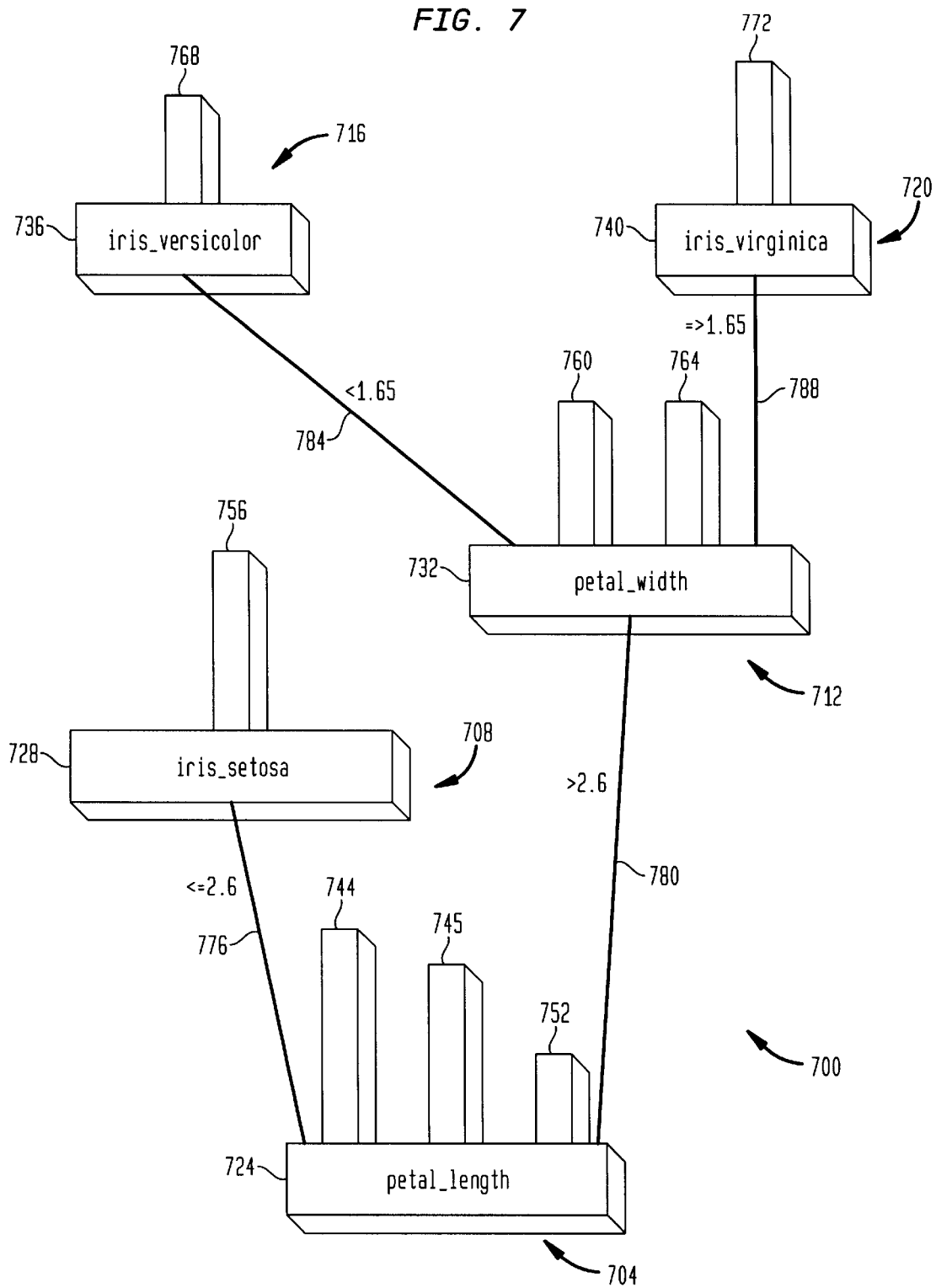
FIG. 7 shows a three-dimensional visualization of a decision-tree classifier in accordance with one embodiment of the present invention.

FIG. 7 shows a three-dimensional visualization 700 of a decision-tree classifier in accordance with one embodiment of the present invention. Specifically, FIG. 7 includes a root-node 704, decision-nodes 708–720, bases 724–740, bars 744–772 and lines 776–788.

In the example of FIG. 7, the decision-tree classifier classifies iris flowers based on two attributes (petal length and petal width). In other words, the decision-tree classifier predicts the iris type based on their petal length and petal width.

Each bar in FIG. 7 represents a class (or type) of flower. For example, at the root-node 704, there are three classes of flowers ($iris_{13}$ setosa, iris_virginica and iris_versicolor). Thus, there are three bars 744, 748 and 752 at the root-node 704. Each node has a base. One or more bars are clustered on each base. The bars can be color-coded to distinguish each class. For example, bars 744 and 756 can be a first color (e.g., blue) to represent iris-setosa. Bars 760 and 768 can likewise be a second color (e.g., black) to represent the iris-versicolor. Bars 752, 764 and 772 can be a third color (e.g., green) to represent iris-virginica.

At the root-node 704, a test is performed based on the attribute "petal length." If the petal length of a flower is less than or equal to 2.6, then that flower is predicted as being an iris_setosa at the decision-node 708. If the petal length of a flower is greater than 2.6, than that flower is again tested at the decision-node 712 based on its petal width. If the petal width is less than 1.65, then the flower is predicted as being an iris_versicolor at the decision-node 716. If on the other hand, the petal width is greater than or equal to 1.65, then the flower is predicted as being an iris_virginica at the decision-node 720.

The height of each bar is proportional to the number of flowers in each class. The higher the number of flowers in a class, the higher is the bar. Thus, a user can understand the distribution of the types of flowers at each node by viewing the bars. This allows the user to comprehend the reliability of a split at each node.

Furthermore, the color of each base indicates the purity of classification at each node. In other words, the user can comprehend how easy it is to predict a type of flower at each node by viewing the color of its corresponding base. For example, since a prediction (flower type=iris-setosa) is made at the node 708, the color of the base indicates that it is easy to predict the type of flower at the node 708. Thus, at the node 708, the purity of classification is high. In contrast, at the root-node 704, it is difficult to make prediction as to the type of flower based on their petal length. Thus, the color of the corresponding base indicates that it is difficult to predict the type of flower at that node based on the petal length. In one example embodiment of the present invention, the color green is used to indicate high purity, the color yellow is used to indicate fair purity and the color red is used to predict low purity. The purity can be computed by one of several entropic formulas which are known in the art.

The present invention allows the user to view a subtree having only one or more nodes of interest. The user can expand (i.e., magnify on the display screen) a subtree and view more information about it. The user selects a subtree (a part of the decision-tree structure) of interest and magnifies it on the display screen (or on other means). By magnifying the subtree of interest, the user learns more about that subtree of interest and ignores the remaining decision-tree structure. This way, the user avoids information overload which appear in other conventional decision-tree visualizers.

Figure 4B:
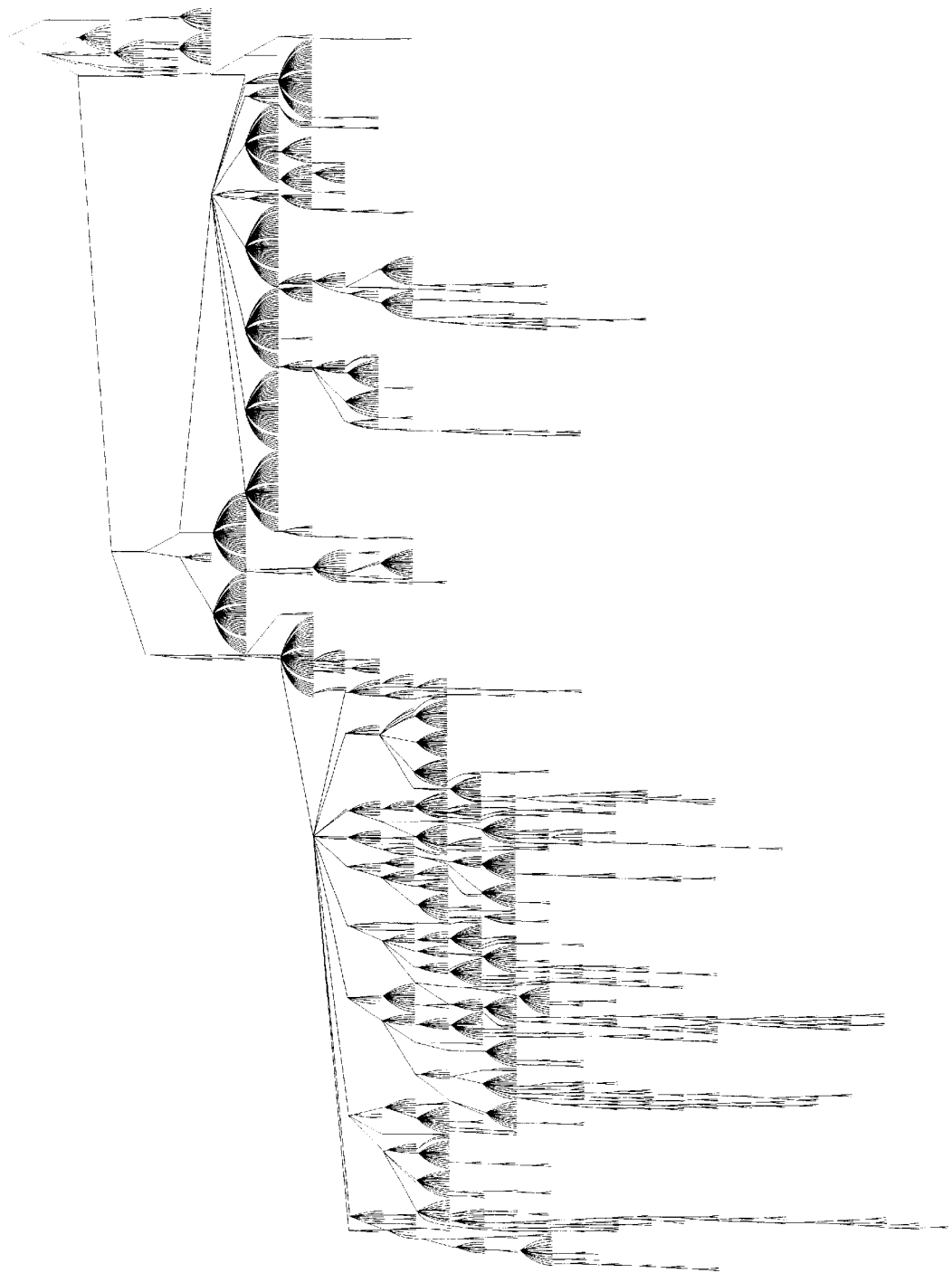
FIG. 4B shows a small decision-tree generated by Dotty (an AT&T product).

For example, the user can expand the node 712 and learn about the distribution of the type of flowers and the purity of the prediction at the node 712. The conventional decision-tree visualizers, such as one shown in FIG. 4, do not have these features.

Example GUI Computer Environment

Figure 8:
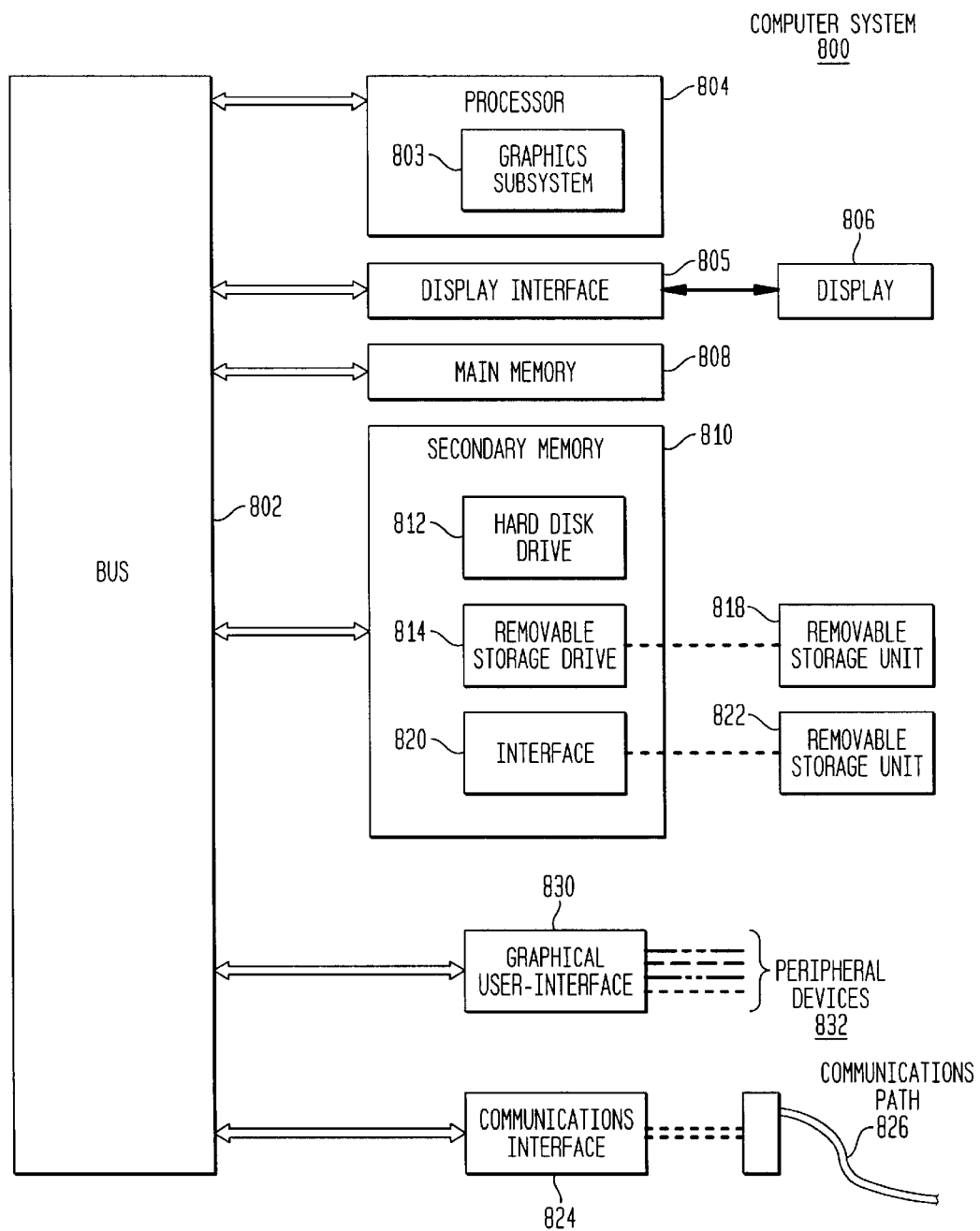
FIG. 8 shows an example graphical user-interface computer system for implementing a hierarchy data visualization tool according to the present invention.

FIG. 8 is a block diagram illustrating an example environment in which the present invention can operate. The environment is a computer system 800 that includes one or more processors, such as processor 804. The processor 804 is connected to a communications bus 802. Various software embodiments are described in terms of this example computer system. After reading this description, it will be apparent to a person skilled in the relevant art how to implement the invention using other computer systems and/or computer architectures.

Computer system 800 includes a graphics subsystem 803. Graphics subsystem 803 can be implemented as one or more processor chips. The graphics subsystem 803 can be included as part of processor 804 as shown in FIG. 24 or as a separate graphics engine or processor. Graphics data is output from the graphics subsystem 803 to the bus 802. Display interface 805 forwards graphics data from the bus 802 for display on the display unit 806. This graphics data includes graphics data for the screen displays described herein.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 2718 in a well known manner. Removable storage unit 818 represents a floppy disk, magnetic tape, optical disk, etc., which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples can include a program cartridge and cartridge interface (such as that found in video game devices), a removable memory chip (such as an EPROM, or PROM) and associated socket, and other removable storage units 822 and interfaces 820 which allow software and data to be transferred rom the removable storage unit 822 to computer system 800.

Computer system 800 can also include a communications interface 824. Communications interface 824 allows software and data to be transferred between computer system 800 and external devices via communications path 826. Examples of communications interface 824 can include a modem, a network interface (such as an Ethernet card), a communications port, etc. Software and data transferred via communications interface 824 are in the form of signals which can be electronic, electromagnetic, optical and other signals capable of being received by communications interface 824, via communications path 826. Note that communications interface 824 provides a mans by which computer system 800 can interface to a network such as the Internet.

Graphical user interface module 830 transfers user inputs from peripheral devices 832 to bus 806. These peripheral devices 832 can be a mouse, keyboard, touch screen, michrophone, joystick, stylus, light pen, or any other type of peripheral unit. These peripheral devices 832 enable a user to operate and control the data visualization tool of the present invention as described herein.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferable implemented using software running (that is, executing) in an environment similar to that described below with respect to FIG. 11. In this document, the term "computer program product" is used to generally refer to removable storage device 818 or a hard disk installed in hard disk drive 812. These computer program products are means for providing software to computer system 800.

Computer programs (also called computer control logic) are stored in main memory and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. Alternatively, the computer program product may be downloaded to computer system 800 over communications path 826. The control logic (software), when executed by the processor 804, causes the processor 804 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Decision-Tree Classifier Visualization a. Example Visualization Tool

Figure 9:
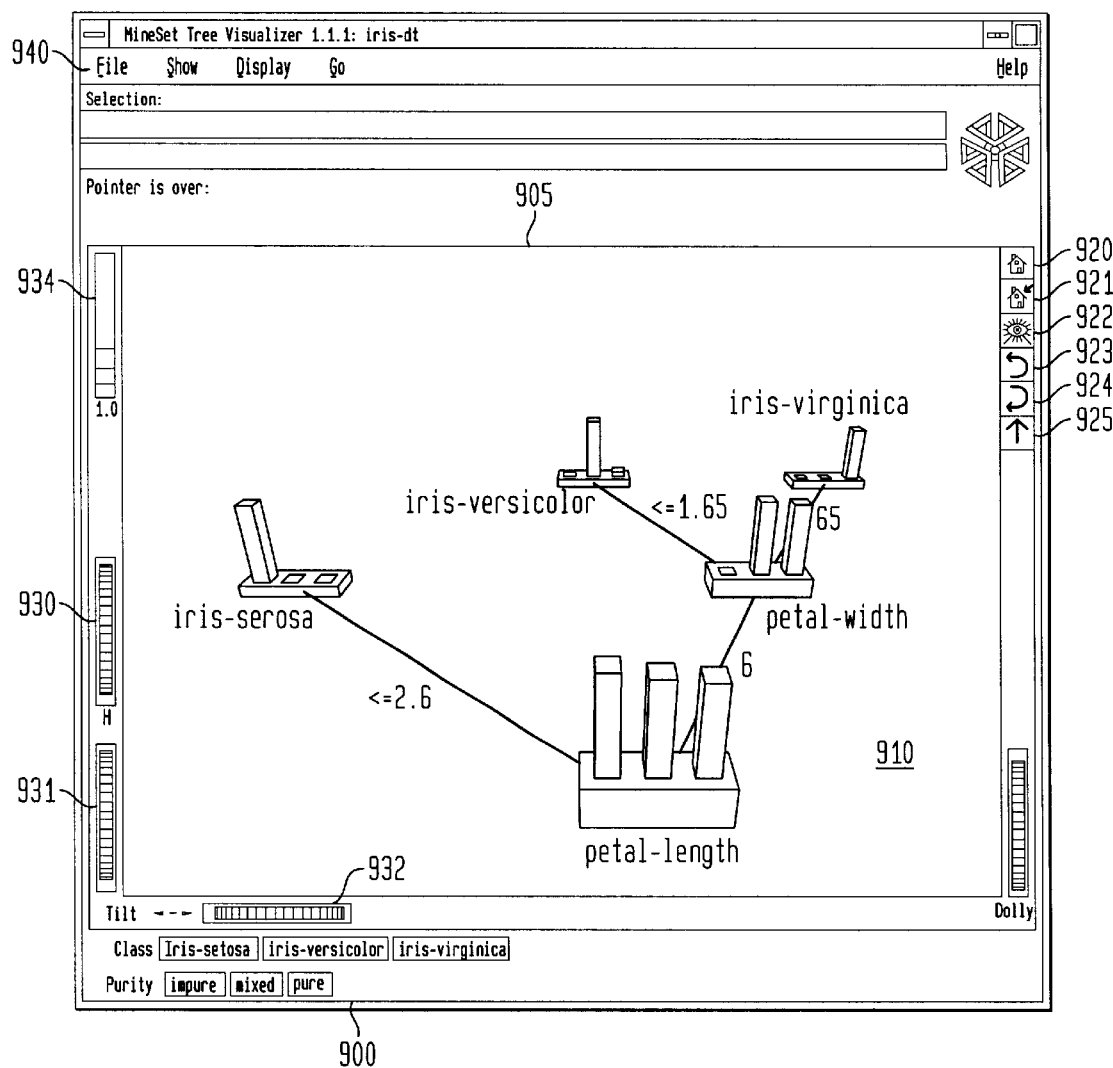
FIG. 9 is a screen display of a visualization tool for implementing the present invention.

FIG. 9 shows a screen display 900 of an example data visualization tool according to the present invention. Screen display 900 includes a main display window 905. A three-dimensional decision-tree visualization 910 is displayed within the main display window 905.

Preferably, the decision-tree visualization 910 is generated from a data file based on a configuration file. The data and configuration files can be generated by the mapping module 550 of FIG. 5. The configuration file describes the format of input data and how the data is to be graphically displayed to form decision-tree visualization 910.

External controls surround the main display window 905. These external controls consist of an array of viewer buttons 920–925, a set of thumb wheels 930–933, and a height slider 934. Home button 920 moves the viewpoint, that is the camera viewpoint, of the main display window to a designated home location. The home location can be an initial location set automatically at start-up or a viewpoint stored during operation of the data visualization tool when a user clicks the Set Home button 921.

View All button 922 permits a user to view the entire decision-tree visualization 910 while keeping a constant tilt and angle of view present at the time the View All button 922 is pressed. For example, to gain an overhead view of decision-tree visualization 910, the field of view (also called a camera view) is rotated to look down on entities in the decision-tree visualization 910. Clicking the View All button 922 then moves a viewpoint providing an overhead view of decision-tree visualization 910.

Go Back button 923 returns the camera viewpoint to an immediately preceding location. Go Forward button 924 returns the camera viewpoint to the location at which a Go Back button 923 was previously pressed. Move Up button 925 is active only when a object in the decision-tree visualization 910 is selected. The operation of the Move Up button 925 depends upon what object or object graphical attribute is selected. If a bar in an object is selected, clicking the Move Up button 925 selects the base containing the bar. If an object base is selected, clicking the Move Up button 925 moves up the hierarchy to the parent node.

The four thumbwheels allow a user to dynamically move the camera viewpoint. Vertical height (H) thumbwheel 930 moves the camera up and down. The camera view point cannot move below ground level. Vertical tilt thumb wheel 931 tilts the direction the camera faces. The tilt varies between a range from straight ahead to straight down. Horizontal pan (<—>) thumbwheel 932 moves the camera viewpoint from left to right (and right to left). The vertical Dolly thumbwheel 933 moves the viewpoint forward and backward from the user. This movement magnifies and reduces the decision-tree visualization 910, thereby, providing more or less detail in the display.

Height slider 934 controls scaling of objects displayed in the decision-tree visualization 910. For example, pushing the slider 934 to a value of 2.0 doubles the size of all objects in the window. Pushing the slider 934 to 1.0 returns objects to original heights.

Mouse controls (not shown) allow further interaction (e.g., zooming and free-form navigation) with a display view. Clicking on an object (e.g. node) selects and zooms to an object. A spotlight shines down and information about the object is displayed automatically.

Clicking another mouse button (e.g. a middle mouse button) allows free-form navigation. Click-and-hold the mouse button moves a camera viewpoint in a free-form path. Move the mouse up while clicking and holding the mouse button, moves the camera viewpoint forward. Moving the mouse back, left, and right, likewise, moves the camera viewpoint backwards, left and right respectively. If the shift button is held down while pressing the middle mouse button, the viewpoint moves up and down.

b. Search Panel

Figure 10A:
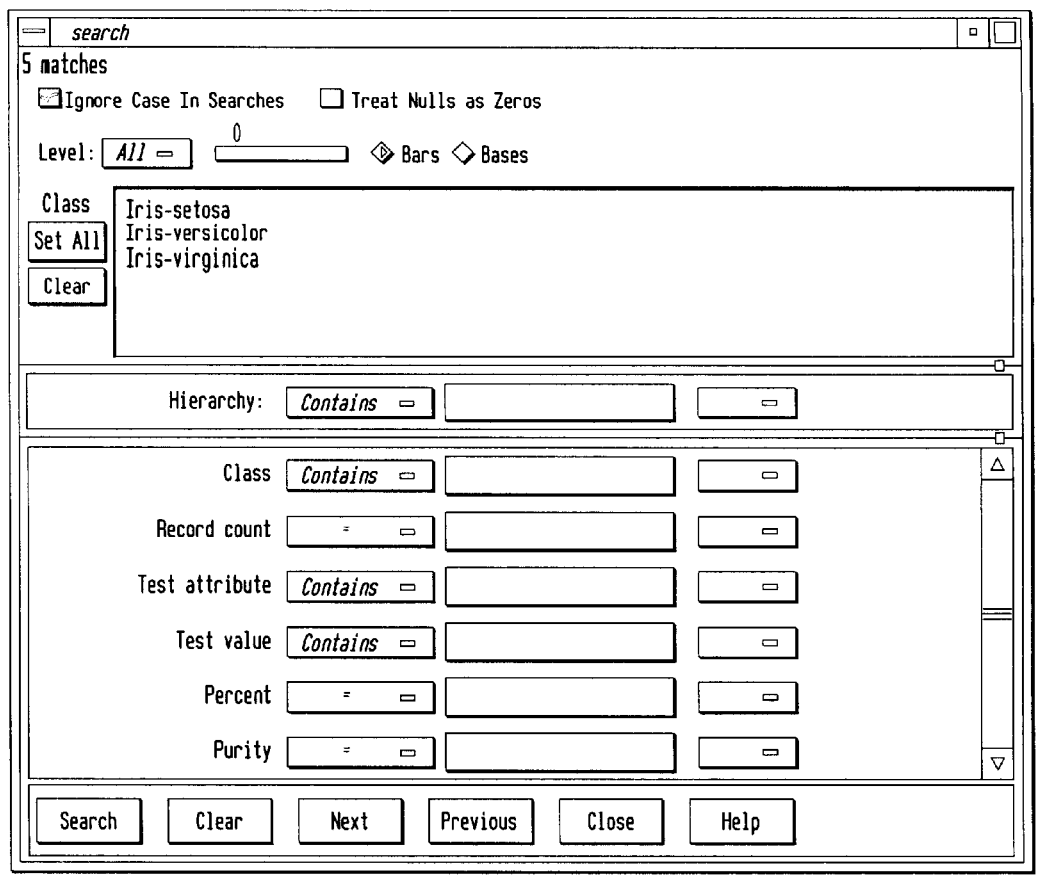
FIG. 10A shows a search panel used to specify criteria to search for objects.

As shown in FIG. 10A, a search panel lets a user bring up a dialog box that is used to specify criteria to search for objects. The search panel can be restricted to specific class labels, either by selecting the values in the class list or by using the Class item, which allows more powerful comparison operators (such as Matches). Other items are described below:

"Record count" lets a user restrict the search to bars or bases (depending on the choice of the radio button bars/bases) with a given number of records. For example, a user can restrict the search to bars containing over 50 records.

"Test attribute" lets a user restrict the search to nodes labeled by the given value that the node is testing. Note that decision node labels represent the test attribute, while leaf node labels show the predicted label. For example, if a user selects Test attribute contains age, only nodes that test the value of age are considered.

"Test value" lets a user restrict the search to nodes having an incoming line labeled with a value a user specify.

"Percent" lets a user restrict the search to bars representing a percentage of the overall records at a node. For example, a user might want to find all nodes such that a given class accounts for more than 80 percent of the records. To do this, click the class label, and select Percent>80. Setting this item is meaningless if a user select bases and not bars (the value for the bases is 0).

"Purity" lets a user restrict the search to nodes with a range of purity levels. For example, if a user wants to look at pure nodes (with one class predominant), a user can select Purity>90.

"Level" lets a user restrict the search to a specific level or range of levels. For example, a user can search only the first five levels.

"Hierarchy" finds all the nodes that match the given value at the trail of the path from the root. It then marks the children of these nodes.

Once the search is completed, yellow spotlights highlight objects matching the search criteria. To display information about an object under a yellow spotlight, a user moves the pointer over that spotlight; the information appears in the upper left corner, under the label "Pointer is over." To select and zoom to an object under a yellow spotlight, a user left-clicks the spotlight; if a user presses the Shift key while clicking, zooming does not occur.

c. Filter Panel

Figure 10B:
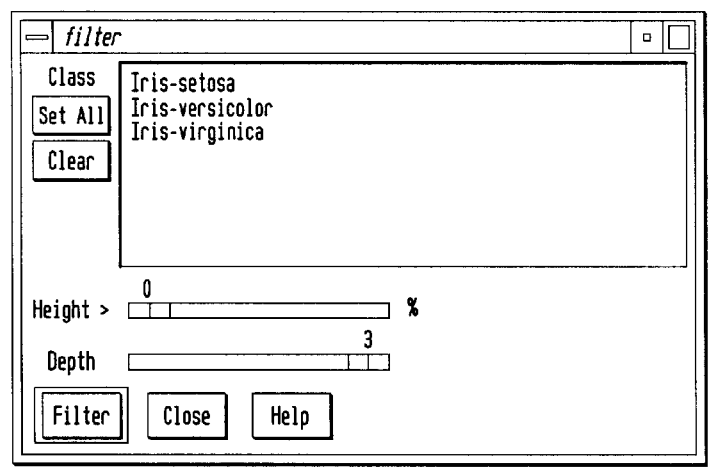
FIG. 10B shows a filter panel for filtering a decision-tree classifier visualization according to the present invention.

As shown in FIG. 10B, a filter panel lets a user input filter criteria to reduce the number of objects displayed in a decision-tree visualization. The Filter panel filters out selected information, thus fine-tuning the decision-tree visualization. A Filter panel can be used to emphasize specific information, or to shrink the amount of data for better performance.

The buttons at the top left of the panel filter the information to be displayed based on specific bars. A user selects the bars to be filtered by clicking on them. The Set All button turns on all bars; this is useful if most of the bars are to be searched, and only a few are to be turned off. The Clear button turns off all bars. If no bar is selected, the bar list is ignored, and nothing is filtered. Filtering bars does not affect the information in the base, which continues to include the summary of all bars.

Below the bar label window of the Filter panel is the Height filter slider. This slider lets a user filter out those graphics that contain only small values. The size of a value is shown as a percentage of the maximum height. Only those nodes that contain at least one bar above the specified value, or which contain descendants in the hierarchy that exceed the specified value, are kept. As long as at least one bar meets this criterion, the complete node is maintained. Although small nodes are filtered out, their values are cumulated up the hierarchy. A user can also set this filtering option in the configuration file by using the Height Filter command:

Click on the Filter button to start filtering. If the Enter key is pressed while the panel is active, filtering automatically starts.

Click on the Close button to save the filtering results and close the panel.

Below the Height filter slider is the Depth slider. The Depth slider lets a user display the hierarchy so that only a given number of levels are displayed at any given time. When a user is at the top of the hierarchy, only the number of hierarchical levels specified by the slider is seen. The nodes in the rows are arranged to optimize their visibility. When navigating to nodes lower in the hierarchy, additional rows are made visible automatically. The nodes above them automatically adjust their locations to accommodate the newly added nodes; thus, some nodes may appear to move.

Example Tool Manager and Network

Figure 11:
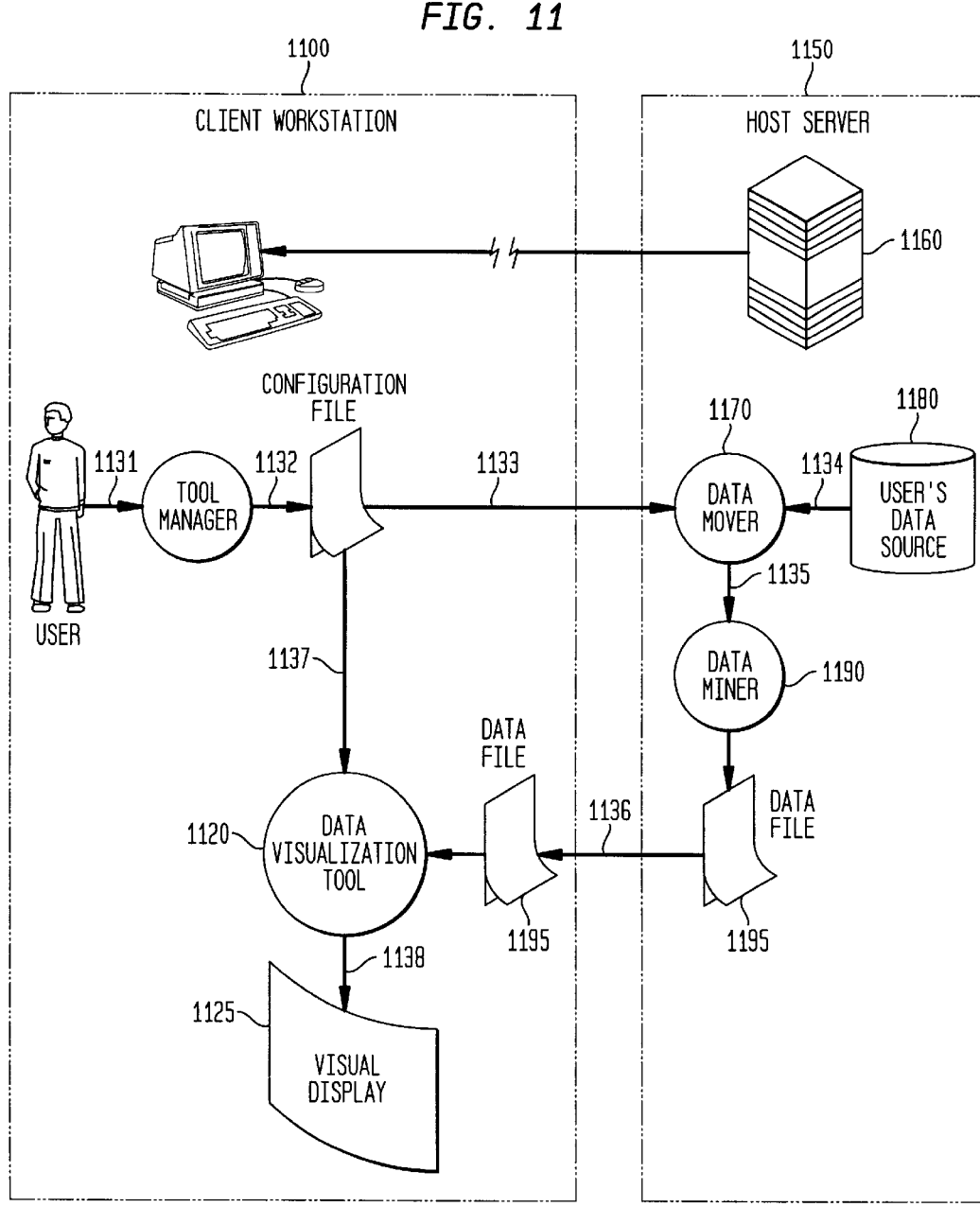
FIG. 11 shows an example client/server network implementing the visualization tool shown in FIG. 9.

FIG. 11 illustrates an overall client/server network environment in which a data visualization tool according to the present invention operates. A client workstation 1100 communicates over a data link 1101 with a host server 1150 as part of a local area network (LAN), campus-wide network, wide-area-network (WAN), or other network type configuration. Any data communication protocol can be used to transport data.

The client workstation 1100 includes a computer system 800 as described above with respect to FIG. 8. The computer system 800 runs a tool manager 1110 for managing operation of a data visualization tool 1120 output on visual display 1125. Preferably, tool manager 1110 and data visualization tool 1120 are software algorithms executed on computer system 800. The host system 1150 includes a host processor 1160 and a data source 1180. Data mover 1170 and data miner 1190 are included at the host server 1150, and preferably, are implemented in software executed by the host processor 1160.

FIG. 11 further illustrates the flow of a data visualization tool execution sequence through steps 1131–1137. First, a user logs onto the client workstation 1100 and opens tool manager 1110 (step 1131). Through the tool manager 1110, the user can select and configure a scatter data visualization tool as described above. A configuration file 1115 must be set which identifies the content to be displayed in a data visualization and appropriate external dimension ranges. To facilitate this process, predefined preference panels, templates and/or data palettes can be accessed through menu-driven commands and pop-up display windows to permit the user to easily define the content of a data visualization and appropriate external dimension ranges.

Figure 12A:
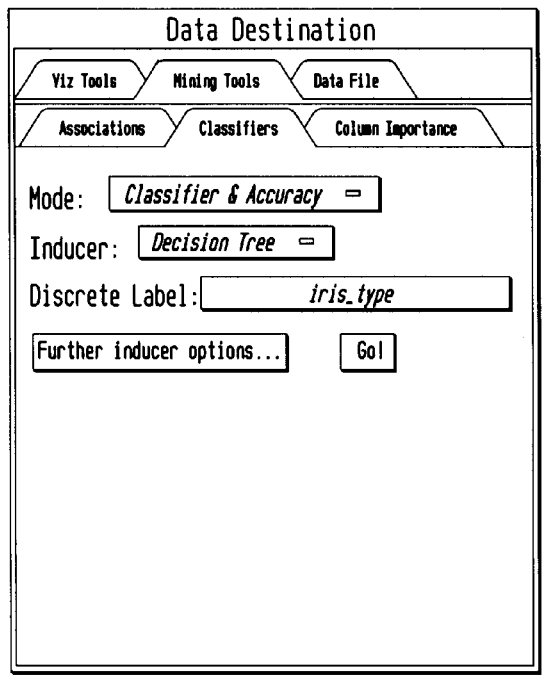
FIG. 12A shows a data destination panel for constructing a configuration file for a decision-tree classifier visualization according to the present invention.
Figure 12B:
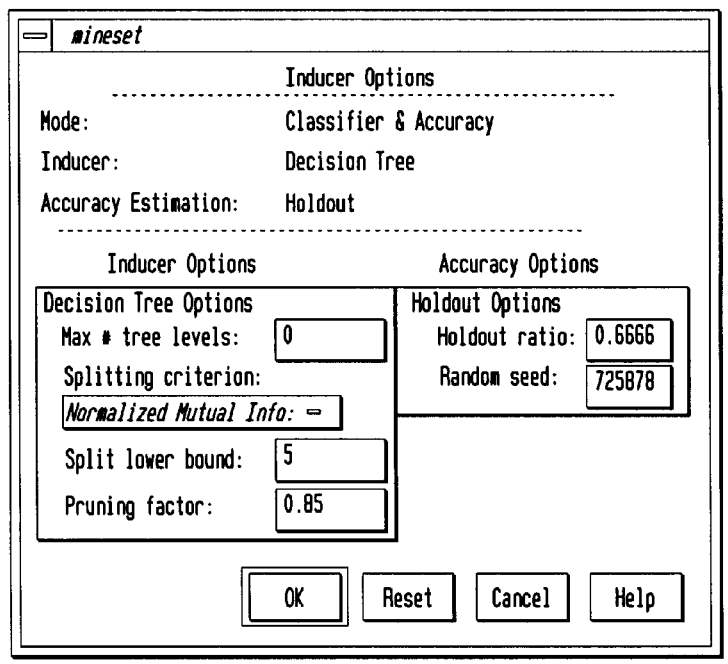
FIG. 12B shows a panel for further inducer options.

FIG. 12A shows a data destination panel that permits a user to construct a configuration file 1115. To access the options for configuring the decision-tree inducer, the Mining Tools panel is selected. Within the Mining Tools panel, a classifier menu could be selected. FIG. 12B shows a panel for further inducer options where the following options can be changed:

Max# tree levels The default (0) indicates there is no limit to the number of levels in the decision tree. A user can limit the number of levels to speed up the induction or when a user wants to study the decision tree and not be distracted by too many nodes. Note that restricting the size decreases the run time but might degrade accuracy. Setting this option does not affect the attributes chosen at levels before the maximum level.

Splitting criterion This option offers three splitting criteria selections. The definitions below are technical. It is difficult to know in advance which one of these criterial might be better. A user should try them all and select the one that leads to the highest accuracy estimate or to a decision-tree a user find easiest to understand.

Mutual Info—This is the change in purity (that is, the entropy) between the parent node and the weighted average of the purities of the child nodes. The weighted average is based on the number of records at each child node.

Normalized Mutual Info (the default)—This is the Mutual Info divided by the log (base2) of the number of child nodes. Gain Ratio—This is the Mutual Info divided by the entropy of the split while ignoring the label values. Normalized Mutual Info and Gain Ratio gives preference to attributes with few values.

Split lower bound This is a lower bound on the number of records that must be present in at least two of the node's children. The default for this option is 5. For example, if there is a three-way split in the node, at least two out of the three children must have at least five records. This provides another method of limiting the size of the decision tree.

Raising this number creates smaller trees and speeds up the induction time. If a user expects the data to contain noise (errors or anomalies), then he can increase this number. If a user's dataset contains only a few hundred records, a user can decrease this number to 2 to 3. If a user's dataset is very small (<100 records), a user might want to decrease this number to 1.

Pruning factor A decision tree is built based on the limits imposed by Max# of Levels and Split Lower Bound. Statistical tests are then made to determine when some subtrees are not significantly better than a single leaf node in which case those subtrees are pruned.

The default pruning factor of 0.85 indicates the recommended amount of pruning to be applied to the decision tree. Higher numbers indicate more pruning; lower numbers indicate less pruning. If a user's data contains noise (errors or anomalies), the user can increase this number to create smaller trees. The lowest possible value is 0 (no pruning); there is no upper value limit.

Pruning is slower than limiting the maximum number of tree levels or increasing the split lower bound because a full tree is build and then pruned. Pruning, however, is done selectively, resulting in a more accurate classifier.

Tool manager 1110 generates a configuration file 1115 defining the content of the data visualization and scope of external dimension space (step 1182). See e.g., MineSet™ User's Guide, Chapter 9, incorporated by reference herein (the entire Mineset™ is incorporated by reference herein).

The configuration file is sent over data link 1101 to the host server 1150 step 1133). A copy of the configuration file 1115 is also stored at the client workstation 1120 for use by the data visualization tool 1125 (step 1137). At the host server 1150, the data mover 1170 extracts data from the data source 1180 corresponding to the configuration file 1115 (step 1134). The data miner 1190 receives extracted data from the data mover 1170 and generates a data file 1195 (step 1135). Data miner 1190 then sends the data file 1195 to the client workstation 1100 (step 1136).

Finally, in step 1138, the decision-tree visualization tool 1120 uses the data file 1195 to generate a decision-tree visualization in a display window as described herein.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-implemented method for visualizing a decision-tree classifier, comprising the steps of:

mapping a structure of the decision-tree classifier into a three-dimensional decision-tree visualization, wherein the decision-tree classifier is induced from a training set, and wherein the three-dimensional decision-tree visualization represents the structure of the decision-tree classifier, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier;

displaying the three-dimensional decision-tree visualization; and at each node in the three-dimensional decision-tree visualization, providing at least one graphical attribute representative of information at a corresponding node of the decision-tree classifier, wherein a graphical attribute represents the number of records in a class at each node, wherein said providing step comprises the step of:

(a) at each node in the three-dimensional decision-tree visualization, providing at least one graphical attribute representative of the number of records in a class at the corresponding node of the decision-tree classifier.

2. A computer-implemented method for visualizing a decision-tree classifier, comprising the steps of:

mapping a structure of the decision-tree classifier into a three-dimensional decision-tree visualization, wherein the decision-tree classifier is induced from a training set, and wherein the three-dimensional decision-tree visualization represents the structure of the decision-tree classifier, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier;

displaying the three-dimensional decision-tree visualization; and at each node in the three-dimensional decision-tree visualization, providing at least one graphical attribute representative of information at a corresponding node of the decision-tree classifier, wherein a graphical attribute represents a distribution of records at each node, wherein said providing step comprises the step of:

(a) at each node in the three-dimensional decision-tree visualization, providing at least one graphical attribute representative of the distribution of records at the corresponding node of the decision-tree classifier.

3. A computer-implemented method for visualizing a decision-tree classifier, comprising the steps of:

mapping a structure of the decision-tree classifier into a three-dimensional decision-tree visualization, wherein the decision-tree classifier is induced from a training set, and wherein the three-dimensional decision-tree visualization represents the structure of the decision-tree classifier, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier;

displaying the three-dimensional decision-tree visualization; and at each node in the three-dimensional decision-tree visualization, providing at least one graphical attribute representative of information at a corresponding node of the decision-tree classifier, wherein a graphical attribute represents purity of classification at each node, wherein said providing step comprises the step of:

(a) at each node in the three-dimensional decision-tree visualization, providing at least one graphical attribute representative of the purity of classification at the corresponding node of the decision-tree classifier.

4. The method of claim 3, wherein said purity of classification indicates how easy it is to make a prediction as to the class of a record, wherein said step (a) comprises the step of:

at each node in the three-dimensional decision-tree visualization, providing at least one graphical attribute indicating how easy it is to make a prediction as to the class of a record at the corresponding node of the decision-tree classifier.

5. A computer-implemented method for visualizing a decision-tree classifier, comprising the steps of:

mapping a structure of the decision-tree classifier into a three-dimensional decision-tree visualization, wherein the decision-tree classifier is induced from a training set, and wherein the three-dimensional decision-tree visualization represents the structure of the decision-tree classifier, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier;

displaying the three-dimensional decision-tree visualization; and at each node in the three-dimensional decision-tree visualization, providing at least one graphical attribute representative of information at a corresponding node of the decision-tree classifier, wherein a graphical attribute represents estimated accuracy of classification at each node, wherein said providing step comprises the step of:

(a) at each node in the three-dimensional decision-tree visualization, providing at least one graphical attribute representative of the estimated accuracy of classification at the corresponding node of the decision-tree classifier.

6. A computer-implemented method for visualizing a decision-tree classifier, comprising the steps of:

mapping a structure of the decision-tree classifier into a three-dimensional decision-tree visualization, wherein the decision-tree classifier is induced from a training set, and wherein the three-dimensional decision-tree visualization represents the structure of the decision-tree classifier, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier;

displaying the three-dimensional decision-tree visualization; and at each node in the three-dimensional decision-tree visualization, providing at least one graphical attribute representative of information at a corresponding node of the decision-tree classifier, wherein a graphical attribute represents estimated reliability of classification at each node, wherein said providing step comprises the step of:

(a) at each node in the three-dimensional decision-tree visualization, providing at least one graphical attribute representative of the estimated reliability of classification at the corresponding node of the decision-tree classifier.

7. The method of claim 3, wherein said providing step comprises the step of:

computing purity by an entropic formula.

8. A computer-implemented method for visualizing a decision-tree classifier, comprising the steps of:

mapping a structure of the decision-tree classifier into a three-dimensional decision-tree visualization, wherein the decision-tree classifier is induced from a training set, and wherein the three-dimensional decision-tree visualization represents the structure of the decision-tree classifier, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier;

displaying the three-dimensional decision-tree visualization; and at each node in the three-dimensional decision-tree visualization, providing at least one graphical attribute representative of information at a corresponding node of the decision-tree classifier, wherein a first graphical attribute comprises a bar, each said node having at least one bar, wherein said providing step comprises the step of:

(a) at each node in the three-dimensional decision-tree visualization, providing at least one bar representative of information at the corresponding node of the decision-tree classifier.

9. The method of claim 8, wherein each bar represents a class, wherein step (a) comprises the step of:

at each node in the three-dimensional decision-tree visualization, providing at least one bar representative of a class at the corresponding node of the decision-tree classifier.

10. The method of claim 8, wherein the height of each bar represents the number of records in each class, wherein step (a) comprises the step of:

at each node in the three-dimensional decision-tree visualization, providing at least one bar with a height representative of the number of records in a class at the corresponding node of the decision-tree classifier.

11. The decision-tree visualizer according to claim 8, wherein the number of records in each bar indicate the estimated reliability of the classification at each node, wherein step (a) comprises the step of:

at each node in the three-dimensional decision-tree visualization, providing at least one bar with a number of records indicating the estimated reliability of the classification of the corresponding node of the decision-tree classifier.

12. A computer-implemented method for visualizing a decision-tree classifier, comprising the steps of:

mapping a structure of the decision-tree classifier into a three-dimensional decision-tree visualization, wherein the decision-tree classifier is induced from a training set, and wherein the three-dimensional decision-tree visualization represents the structure of the decision-tree classifier, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier;

displaying the three-dimensional decision-tree visualization; and at each node in the three-dimensional decision-tree visualization, providing at least one graphical attribute representative of information at a corresponding node of the decision-tree classifier wherein a second graphical attribute is a base, each said node has a representative base, wherein said providing step comprises the step of:

(a) at each node in the three-dimensional decision-tree visualization, providing at least one base representative of information at the corresponding node of the decision-tree classifier, wherein each base has a color that indicates the purity of the classification, wherein step (a) comprises the step of:

(i) at each node in the three-dimensional decision-tree visualization, providing at least one base indicating the purity of the classification at the corresponding node of the decision-tree classifier.

13. A computer-implemented method for visualizing a decision-tree classifier, comprising the steps of:

mapping a structure of the decision-tree classifier into a three-dimensional decision-tree visualization, wherein the decision-tree classifier is induced from a training set, and wherein the three-dimensional decision-tree visualization represents the structure of the decision-tree classifier, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier;

displaying the three-dimensional decision-tree visualization; and at each node in the three-dimensional decision-tree visualization, providing at least one graphical attribute representative of information at a corresponding node of the decision-tree classifier wherein a second graphical attribute is a base, each said node has a representative base, wherein said providing step comprises the step of:

(a) at each node in the three-dimensional decision-tree visualization, providing at least one base representative of information at the corresponding node of the decision-tree classifier, wherein each base has a height that represents the total number of records at each node, wherein step (a) comprises the step of:

at each node in the three-dimensional decision-tree visualization, providing at least one base with a height representative of the total number of records at the corresponding node of the decision-tree classifier.

14. The method of claim 12, wherein the color red indicates low purity, yellow indicates fair purity and green indicates high purity, wherein step (i) comprises the step of:

at each node in the three-dimensional decision-tree visualization, providing at least one base with a color indicating the level of purity at the corresponding node of the decision-tree classifier.

15. The method of claim 12, wherein said providing step comprises the step of:

computing purity by an entropic formula.

16. A computer-implemented system for visualizing a decision-tree classifier, comprising:

means for mapping a structure of said decision-tree classifier into a three-dimensional decision-tree visualization having nodes and lines, wherein said decision-tree classifier is induced from a training set, and wherein said three-dimensional decision-tree visualization represents said structure of said decision-tree classifier;

means for displaying said three-dimensional decision-tree visualization, wherein said nodes in said three-dimensional decision-tree visualization are arranged in a hierarchy and connected by said lines, said nodes in said three-dimensional decision-tree visualization correspond to nodes in said decision-tree classifier; and at each node in said three-dimensional decision-tree visualization, means for providing at least one graphical object, said graphical object having at least one graphical attribute representative of information at a corresponding node of said decision-tree classifier, wherein a graphical attribute represents the number of record in a class at each node.

17. A computer-implemented system for visualizing a decision-tree classifier, comprising:

means for mapping a structure of said decision-tree classifier into a three-dimensional decision-tree visualization having nodes and lines, wherein said decision-tree classifier is induced from a training set, and wherein said three-dimensional decision-tree visualization represents said structure of said decision-tree classifier;

means for displaying said three-dimensional decision-tree visualization, wherein said nodes in said three-dimensional decision-tree visualization are arranged in a hierarchy and connected by said lines, said nodes in said three-dimensional decision-tree visualization correspond to nodes in said decision-tree classifier; and at each node in said three-dimensional decision-tree visualization, means for providing at least one graphical object, said graphical object having at least one graphical attribute representative of information at a corresponding node of said decision-tree classifier, wherein a graphical attribute represents a distribution of records at each node.

18. A computer-implemented system for visualizing a decision-tree classifier, comprising:

means for mapping a structure of said decision-tree classifier into a three-dimensional decision-tree visualization having nodes and lines, wherein said decision-tree classifier is induced from a training set, and wherein said three-dimensional decision-tree visualization represents said structure of said decision-tree classifier;

means for displaying said three-dimensional decision-tree visualization, wherein said nodes in said three-dimensional decision-tree visualization are arranged in a hierarchy and connected by said lines, said nodes in said three-dimensional decision-tree visualization correspond to nodes in said decision-tree classifier; and at each node in said three-dimensional decision-tree visualization, means for providing at least one graphical object, said graphical object having at least one graphical attribute representative of information at a corresponding node of said decision-tree classifier, wherein a graphical attribute represents purity of classification at each node.

19. The system of claim 18, wherein said purity of classification indicates how easy it is to make a prediction as to the class of a record.

20. A computer-implemented system for visualizing a decision-tree classifier, comprising:

means for mapping a structure of said decision-tree classifier into a three-dimensional decision-tree visualization having nodes and lines, wherein said decision-tree classifier is induced from a training set, and wherein said three-dimensional decision-tree visualization represents said structure of said decision-tree classifier;

means for displaying said three-dimensional decision-tree visualization, wherein said nodes in said three-dimensional decision-tree visualization are arranged in a hierarchy and connected by said lines, said nodes in said three-dimensional decision-tree visualization correspond to nodes in said decision-tree classifier; and at each node in said three-dimensional decision-tree visualization, means for providing at least one graphical object, said graphical object having at least one graphical attribute representative of information at a corresponding node of said decision-tree classifier, wherein a graphical attribute represents estimated reliability of classification at each node.

21. The system of claim 18, wherein said purity is computed by an entropic formula.

22. A computer-implemented system for visualizing a decision-tree classifier, comprising:

means for mapping a structure of said decision-tree classifier into a three-dimensional decision-tree visualization having nodes and lines, wherein said decision-tree classifier is induced from a training set, and wherein said three-dimensional decision-tree visualization represents said structure of said decision-tree classifier;

means for displaying said three-dimensional decision-tree visualization, wherein said nodes in said three-dimensional decision-tree visualization are arranged in a hierarchy and connected by said lines, said nodes in said three-dimensional decision-tree visualization correspond to nodes in said decision-tree classifier; and at each node in said three-dimensional decision-tree visualization, means for providing at least one graphical object, said graphical object having at least one graphical attribute representative of information at a corresponding node of said decision-tree classifier, wherein a graphical attribute is a bar, each said node having at least one of said bar.

23. The system of claim 22, wherein each bar represents a class.

24. The system of claim 22, wherein the height of each bar represents the number of records in each class.

25. The system of claim 24, wherein the number of records in each bar indicate the estimated reliability of the classification at each node.

26. A computer-implemented system for visualizing a decision-tree classifier, comprising:

means for mapping a structure of said decision-tree classifier into a three-dimensional decision-tree visualization having nodes and lines, wherein said decision-tree classifier is induced from a training set, and wherein said three-dimensional decision-tree visualization represents said structure of said decision-tree classifier;

means for displaying said three-dimensional decision-tree visualization, wherein said nodes in said three-dimensional decision-tree visualization are arranged in a hierarchy and connected by said lines, said nodes in said three-dimensional decision-tree visualization correspond to nodes in said decision-tree classifier; and at each node in said three-dimensional decision-tree visualization, means for providing at least one graphical object, said graphical object having at lease one graphical attribute representative of information at a corresponding node of said decision-tree classifier, wherein a graphical attribute is a base, each said node having at least one said base, wherein each base has a color that indicates the estimated accuracy of the classification at each node.

27. A computer-implemented system for visualizing a decision-tree classifier, comprising:

means for mapping a structure of said decision-tree classifier into a three-dimensional decision-tree visualization having nodes and lines, wherein said decision-tree classifier is induced from a training set, and wherein said three-dimensional decision-tree visualization represents said structure of said decision-tree classifier;

means for displaying said three-dimensional decision-tree visualization, wherein said nodes in said three-dimensional decision-tree visualization are arranged in a hierarchy and connected by said lines, said nodes in said three-dimensional decision-tree visualization correspond to nodes in said decision-tree classifier; and at each node in said three-dimensional decision-tree visualization, means for providing at least one graphical object, said graphical object having at lease one graphical attribute representative of information at a corresponding node of said decision-tree classifier, wherein a graphical attribute is a base, each said node having at least one said base, wherein each base has a color that indicates the purity of classification at each node.

28. A computer-implemented system for visualizing a decision-tree classifier, comprising:

means for mapping a structure of said decision-tree classifier into a three-dimensional decision-tree visualization having nodes and lines, wherein said decision-tree classifier is induced from a training set, and wherein said three-dimensional decision-tree visualization represents said structure of said decision-tree classifier;

means for displaying said three-dimensional decision-tree visualization, wherein said nodes in said three-dimensional decision-tree visualization are arranged in a hierarchy and connected by said lines, said nodes in said three-dimensional decision-tree visualization correspond to nodes in said decision-tree classifier; and at each node in said three-dimensional decision-tree visualization, means for providing at least one graphical object, said graphical object having at least one graphical attribute representative of information at a corresponding node of said decision-tree classifier, wherein a graphical attribute is a base, each said node having at least one said base, wherein each base has a height that represents the total number of records at each node.

29. The system of claim 27, wherein the color red indicates low purity, yellow indicates fair purity and green indicates high purity.

30. A computer program product comprising a computer useable medium having computer program logic recorded thereon for enabling a processor in a computer system to visualize a decision-tree classifier, comprising:

(a) means for enabling said processor to map a structure of said decision-tree classifier into a three-dimensional decision-tree visualization having nodes and lines, wherein said decision-tree classifier is induced from a training set, and wherein said three-dimensional decision-tree visualization represents said structure of said decision-tree classifier;

(b) means for enabling said processor to cause the displaying of said three-dimensional decision-tree visualization, wherein said nodes in said three-dimensional decision-tree visualization are arranged in a hierarchy and connected by said lines, said nodes in said three-dimensional decision-tree visualization correspond to nodes in said decision-tree classifier; and (c) means for enabling a processor to provide at least one graphical object at each node in said three-dimensional decision-tree visualization, said graphical object having at least one graphical attribute representative of information at a corresponding node of said decision-tree classifier, wherein a graphical attribute represents the number of record in a class at each node.

31. A decision-tree classifier visualization system, comprising:

an inducer that generates at least one visualization file representative of a three-dimensional visualization of a structure of a decision-tree classifier, wherein said inducer generates said at least one visualization file based on a training set; wherein said at least one visualization file can be transformed into a three-dimensional visualization of a decision-tree classifier, and wherein said three-dimensional decision-tree classifier visualization represents said structure of said decision-tree classifier, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier, wherein at each node in the three-dimensional decision-tree visualization at least one graphical attribute is representative of information at a corresponding node of the decision-tree classifier, wherein a graphical attribute represents the number of records in a class at each node.

32. The system of claim 31, wherein said inducer includes a mapping module that maps a training set used by the inducer to generate the decision-tree classifier to said at least one visualization file.

33. A network system, comprising:

a tool manager that generates a configuration file;

a data mover that extracts data from a data source corresponding to said configuration file;

a data miner that receives extracted data from said data mover and generates a data file, wherein said data file is representative of a structure of a decision-tree classifier induced from a training set;

a data visualization tool that receives said data file from said data miner and generates a three-dimensional decision-tree classifier visualization, wherein said three-dimensional decision-tree classifier visualization represents said structure of said decision-tree classifier; and a display that displays said three-dimensional decision-tree classifier visualization, wherein the three-dimensional decision-tree visualization includes nodes, the nodes in the three-dimensional decision-tree visualization including graphical objects representing nodes arranged in a hierarchy, the nodes in the three-dimensional decision-tree visualization corresponding to nodes in the decision-tree classifier, wherein at each node in the three-dimensional decision-tree visualization at least one graphical attribute is provided that is representative of information at a corresponding node of the decision-tree classifier, wherein a graphical attribute represents the number of records in a class at each node.

34. The system of claim 33, wherein said configuration file identifies the content to be displayed in a data visualization and scope of external dimension space.

* * * * *